US012774374B2

(12) United States Patent
Nakanishi et al.

(10) Patent No.: US 12,774,374 B2
(45) Date of Patent: Oct. 27, 2026

(54) METHOD OF MANUFACTURING RESIN MEMBER, AND RESIN MEMBER

(71) Applicant: HAMAMATSU PHOTONICS K.K., Hamamatsu (JP)

(72) Inventors: Atsushi Nakanishi, Hamamatsu (JP); Yuta Kine, Hamamatsu (JP); Takeshi Watari, Hamamatsu (JP); Takashi Kurita, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 189 days.

(21) Appl. No.: 18/397,004

(22) Filed: Dec. 27, 2023

(65) Prior Publication Data

US 2024/0218140 A1 Jul. 4, 2024

(30) Foreign Application Priority Data

Jan. 4, 2023 (JP) ................................ 2023-000149

(51) Int. Cl.
*C08J 7/12* (2006.01)

(52) U.S. Cl.
CPC ........... *C08J 7/123* (2013.01); *C08J 2323/12* (2013.01); *C08J 2355/02* (2013.01); *C08J 2377/02* (2013.01); *C08J 2497/02* (2013.01)

(58) Field of Classification Search
CPC .... C08J 7/123; C08J 2355/02; C08J 2497/02; C08J 2323/12; C08J 2377/02
See application file for complete search history.

(56) References Cited

U.S. PATENT DOCUMENTS

| | | | | |
|---|---|---|---|---|
| 2004/0047578 | A1* | 3/2004 | Fukuda | B23K 26/0624 385/129 |
| 2020/0024795 | A1* | 1/2020 | Gurijala | B29C 70/025 |

FOREIGN PATENT DOCUMENTS

| | | | | |
|---|---|---|---|---|
| CN | 101525487 B * | 1/2012 | C08L 3/02 |
| JP | H11-278990 A | 10/1999 | |
| JP | 2003-073813 A | 3/2003 | |
| JP | 2008-013599 A | 1/2008 | |
| JP | 2008-257344 A | 10/2008 | |

OTHER PUBLICATIONS

Wang et al "All-solid-state supercapacitors from natural lignin-based composite film by laser direct writing" in Appl. Phys. Lett. 115, 083904 (2019) p. 1-5. (Year: 2019).*

* cited by examiner

*Primary Examiner* — Nathan H Empie
(74) *Attorney, Agent, or Firm* — Faegre Drinker Biddle & Reath LLP

(57) ABSTRACT

Provided is a method of manufacturing a resin member. The method includes irradiating a surface of a member containing a resin and a plant powder dispersed in the resin with laser light to change the plant powder or both the resin and the plant powder into diamond-like carbon in a surface layer region including the surface of the member.

6 Claims, 34 Drawing Sheets

| TEST No. | 1 | 2 |
|---|---|---|
| |  |  |
| PROCESSING PORTION HEIGHT [μm] | 47.6 | 38.3 |
| AVERAGE OUTPUT [mW] | 80 | 91 |
| PULSE ENERGY [μJ] | 0.80 | 0.91 |
| BEAM DIAMETER [μm] | 727 | 727 |
| IRRADIATION INTENSITY [GW/cm$^2$] | 0.19 | 0.22 |
| FLUENCE [mJ/cm$^2$] | 0.19 | 0.22 |
| PROCESSING PITCH (X) [μm] | 0.001 | 0.001 |
| PROCESSING PITCH (Y) [μm] | 50.0 | 120.0 |

| TEST No. | 3 | 4 | 5 |
|---|---|---|---|
| |  |  |  |
| PROCESSING PORTION HEIGHT [μm] | 28.7 | 29.2 | 36.6 |
| AVERAGE OUTPUT [mW] | 103 | 117 | 131 |
| PULSE ENERGY [μJ] | 1.03 | 1.17 | 1.31 |
| BEAM DIAMETER [μm] | 727 | 727 | 727 |
| IRRADIATION INTENSITY [GW/cm$^2$] | 0.25 | 0.28 | 0.32 |
| FLUENCE [mJ/cm$^2$] | 0.25 | 0.28 | 0.32 |
| PROCESSING PITCH (X) [μm] | 0.001 | 0.001 | 0.001 |
| PROCESSING PITCH (Y) [μm] | 170.0 | 210.0 | 230.0 |

| TEST No. | 6 | 7 | 8 |
|---|---|---|---|
| ABS + 50 wt % OF WOOD POWDER |  |  |  |
| AVERAGE OUTPUT [mW] | 83 | 94 | 105 |
| PULSE ENERGY [μJ] | 0.83 | 0.94 | 1.05 |
| BEAM DIAMETER [μm] | 727 | 727 | 727 |
| IRRADIATION INTENSITY [GW/cm$^2$] | 0.20 | 0.23 | 0.25 |
| FLUENCE [mJ/cm$^2$] | 0.20 | 0.23 | 0.25 |
| PROCESSING PITCH (X) [μm] | 0.001 | 0.001 | 0.001 |
| PROCESSING PITCH (Y) [μm] | 50.0 | 120.0 | 170.0 |

| TEST No. | 9 | 10 | 11 | 12 |
|---|---|---|---|---|
| ABS + 50 wt % OF WOOD POWDER |  |  |  |  |
| AVERAGE OUTPUT [mW] | 119 | 131 | 153 | 168 |
| PULSE ENERGY [μJ] | 1.19 | 1.31 | 1.53 | 1.68 |
| BEAM DIAMETER [μm] | 727 | 727 | 727 | 727 |
| IRRADIATION INTENSITY [$GW/cm^2$] | 0.29 | 0.32 | 0.37 | 0.40 |
| FLUENCE [$mJ/cm^2$] | 0.29 | 0.32 | 0.37 | 0.40 |
| PROCESSING PITCH (X) [μm] | 0.001 | 0.001 | 0.001 | 0.001 |
| PROCESSING PITCH (Y) [μm] | 210.0 | 230.0 | 230 | 230 |

| TEST No. | 13 | 14 | 15 |
|---|---|---|---|
| PA6 + 50 wt % OF WOOD POWDER |  |  |  |
| AVERAGE OUTPUT [mW] | 83 | 94 | 105 |
| PULSE ENERGY [μJ] | 0.83 | 0.94 | 1.05 |
| BEAM DIAMETER [μm] | 727 | 727 | 727 |
| IRRADIATION INTENSITY [GW/cm$^2$] | 0.20 | 0.23 | 0.25 |
| FLUENCE [mJ/cm$^2$] | 0.20 | 0.23 | 0.25 |
| PROCESSING PITCH (X) [μm] | 0.001 | 0.001 | 0.001 |
| PROCESSING PITCH (Y) [μm] | 50.0 | 120.0 | 170.0 |

| TEST No. | 16 | 17 | 18 | 19 |
|---|---|---|---|---|
| PA6 + 50 wt % OF WOOD POWDER |  |  |  |  |
| AVERAGE OUTPUT [mW] | 119 | 131 | 153 | 168 |
| PULSE ENERGY [μJ] | 1.19 | 1.31 | 1.53 | 1.68 |
| BEAM DIAMETER [μm] | 727 | 727 | 727 | 727 |
| IRRADIATION INTENSITY [GW/cm$^2$] | 0.29 | 0.32 | 0.37 | 0.40 |
| FLUENCE [mJ/cm$^2$] | 0.29 | 0.32 | 0.37 | 0.40 |
| PROCESSING PITCH (X) [μm] | 0.001 | 0.001 | 0.001 | 0.001 |
| PROCESSING PITCH (Y) [μm] | 210.0 | 230.0 | 230 | 230 |

| TEST No. | 20 | 21 | 22 | 23 |
| --- | --- | --- | --- | --- |
| PP + 30 wt % OF BAMBOO POWDER |  |  |  |  |
| FLUENCE [$mJ/cm^2$] | 0.26 | 0.30 | 0.34 | 0.39 |

| TEST No. | 24 | 25 | 26 | 27 |
|---|---|---|---|---|
| PP + 50 wt % OF BAMBOO POWDER |  |  |  |  |
| FLUENCE [mJ/cm$^2$] | 0.10 | 0.17 | 0.26 | 0.36 |

| |  |  |  |  |
|---|---|---|---|---|
| WHETHER OR NOT DLC HAS BEEN FORMED | B | B | A | A |
| WAVELENGTH [nm] | 515 | 515 | 515 | 515 |
| PULSE WIDTH [ps] | 1.0 | 1.0 | 1.0 | 1.0 |
| MAXIMUM OUTPUT [MW] | 0.42 | 0.47 | 0.52 | 0.57 |
| FLUENCE [mJ/cm$^2$] | 0.10 | 0.11 | 0.13 | 0.14 |

| | WITHOUT PROCESSING TRACE |  |  |  |
|---|---|---|---|---|
| WHETHER OR NOT DLC HAS BEEN FORMED | B | A | A | A |
| WAVELENGTH [nm] | 1030 | 1030 | 1030 | 1030 |
| PULSE WIDTH [ps] | 1.0 | 1.0 | 1.0 | 1.0 |
| MAXIMUM OUTPUT [MW] | 5.7 | 7.3 | 8 | 11.6 |
| FLUENCE [mJ/cm$^2$] | 3.11 | 4.00 | 4.37 | 6.35 |

| | WITHOUT PROCESSING TRACE |  |  |  |  |
|---|---|---|---|---|---|
| WHETHER OR NOT DLC HAS BEEN FORMED | B | B | B | A | A |
| WAVELENGTH [nm] | 1064 | 1064 | 1064 | 1064 | 1064 |
| PULSE WIDTH [μs] | 1.0 | 1.0 | 1.0 | 1.0 | 1.0 |
| MAXIMUM OUTPUT [MW] | 5.7 | 8.2 | 8.7 | 9.4 | 10.1 |
| FLUENCE [mJ/cm$^2$] | 4.37 | 6.35 | 6.70 | 7.23 | 7.77 |

METHOD OF MANUFACTURING RESIN MEMBER, AND RESIN MEMBER

TECHNICAL FIELD

The present disclosure relates to a method of manufacturing a resin member, and a resin member.

BACKGROUND

Japanese Unexamined Patent Publication No. H11-278990 discloses a method of forming a diamond-like carbon film on a surface of an article by using a plasma CVD method.

SUMMARY

In a case of depositing a diamond-like carbon film on a surface of an article as in the forming method described in Japanese Unexamined Patent Publication No. H11-278990, the quality of the diamond-like carbon film may be affected by surface roughness of the article.

An object of the present disclosure is to provide a method of manufacturing a resin member and a resin member which are capable of reducing a variation in quality of a diamond-like carbon due to surface roughness of the resin member containing the diamond-like carbon in a surface layer region.

[1] A method of manufacturing a resin member according to the present disclosure includes irradiating a surface of a member containing a resin and a plant powder dispersed in the resin with laser light to change the plant powder or both the resin and the plant powder into diamond-like carbon in a surface layer region including the surface of the member.

In the method of manufacturing a resin member, the plant powder is changed (for example, carbonized) due to irradiation with laser light, and the diamond-like carbon is generated. In the method, the plant powder existing already in a region ranging from the surface of the resin member to the inside thereof is changed into the diamond-like carbon differently from a method of depositing a diamond-like carbon film on a surface of a resin member. In this case, the quality of the generated diamond-like carbon is hardly affected by surface roughness of the resin member. According to the manufacturing method, in the resin member containing the diamond-like carbon in the surface layer region, a deviation in the quality of the diamond-like carbon due to surface roughness of the resin member can be reduced. In addition, since the plant powder existing already in the region ranging from the surface of the member to the inside thereof is changed into the diamond-like carbon, the diamond-like carbon is less likely to be peeled off in comparison to a case of forming a diamond-like carbon film, for example, by a CVD method or the like. Particularly, for example, in a case where a stress is applied to the resin member for industrial applications over a long period of time, there is a concern that the diamond-like carbon film formed by the CVD method or the like is peeled off. In the present method of manufacturing the resin member, since the diamond-like carbon is less likely to be peeled off from the resin member, it is possible to expect that an effect of preventing corrosion or abrasion is exhibited over a long period of time. According to the present disclosure, a product with higher reliability can be realized.

[2] In the method of manufacturing a resin member according to [1], a wavelength of the laser light may be 550 nm or less, and a fluence of the laser light may be 0.1 mJ/cm$^2$ or more. As a result of this, energy can be sufficiently applied to the plant powder contained in the member. Accordingly, the diamond-like carbon is formed in a satisfactory manner.

[3] In the method of manufacturing a resin member according to [1] or [2], the laser light may be pulsed light, and a pulse width of the laser light may be 100 ps or less. As a result of this, energy can be sufficiently applied to the plant powder contained in the member. Accordingly, the diamond-like carbon is formed in a satisfactory manner.

[4] In the method of manufacturing a resin member according to any one of [1] to [3], a content rate of the plant powder in the member before irradiation with the laser light may be 30 wt % or more. According to experiment results, when the content rate of the plant powder is 30 wt % or more, energy necessary for laser light can be significantly reduced in comparison to a case where the content rate of the plant powder is less than 30 wt %.

[5] In the method of manufacturing a resin member according to any one of [1] to [4], the plant powder may include one or both of a wood powder and a bamboo powder. According to experiment results, for example, in this case, the plant powder can be changed into the diamond-like carbon.

[6] In the method of manufacturing a resin member according to any one of [1] to [5], the resin may include at least one material among polypropylene, nylon 6, and an ABS resin. According to experiment results, for example, in this case, the plant powder can be changed into the diamond-like carbon.

[7] In the method of manufacturing a resin member according to any one of [1] to [6], when irradiating the surface of the member with laser light, scanning with the laser light may be performed along the surface while condensing the laser light. In this case, the diamond-like carbon can be formed in a desired area while raising an energy density of the laser light.

[8] A resin member according to the present disclosure is a resin member having a surface, and contains a resin, a plant powder dispersed in the resin, and a diamond-like carbon dispersed in a surface layer region including the surface in the resin. Since the resin member contains the diamond-like carbon dispersed in the surface layer region including the surface, the resin member is less likely to be corroded and abraded. In addition, the resin member can be more easily manufactured, for example, by changing the plant powder dispersed in the surface layer region of the resin member into the diamond-like carbon. Accordingly, it is possible to provide a resin member in which a deviation in the quality of the diamond-like carbon due to surface roughness of the resin member is reduced.

[9] In the resin member according to [8], a content rate of the plant powder in other regions in the resin other than the surface layer region may be 30 wt % or more. According to experiment results, when the content rate of the plant powder is 30 wt % or more, energy necessary for laser light can be significantly reduced in comparison to a case where the content rate of the plant powder is less than 30 wt %.

[10] In the resin member according to [8] or [9], the surface layer region may mainly contain the diamond-like carbon. In this case, the resin member is further less likely to be corroded and abraded.

[11] In the resin member according to any one of [8] to [10], the resin member may be used as a component for vehicles, a component for household electric appliances, or a component for houses. As a result of this, it is possible to provide a component for vehicles, a component for household electric appliances, or a component for houses which are less likely to be corroded and abraded.

[12] In the resin member according to any one of [8] to [11], the plant powder may include one or both of a wood powder and a bamboo powder. According to experiment results, for example, in this case, the plant powder can be changed into the diamond-like carbon.

[13] In the resin member according to any one of [8] to [12], the resin may include at least one material among polypropylene, nylon 6, and an ABS resin. According to experiment results, for example, in this case, the plant powder can be changed into the diamond-like carbon.

According to the present disclosure, it is possible to provide a method of manufacturing a resin member which is capable of reducing a variation in quality of a diamond-like carbon due to surface roughness of the resin member containing the diamond-like carbon in a surface layer region, and the resin member.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION

Figure 1:
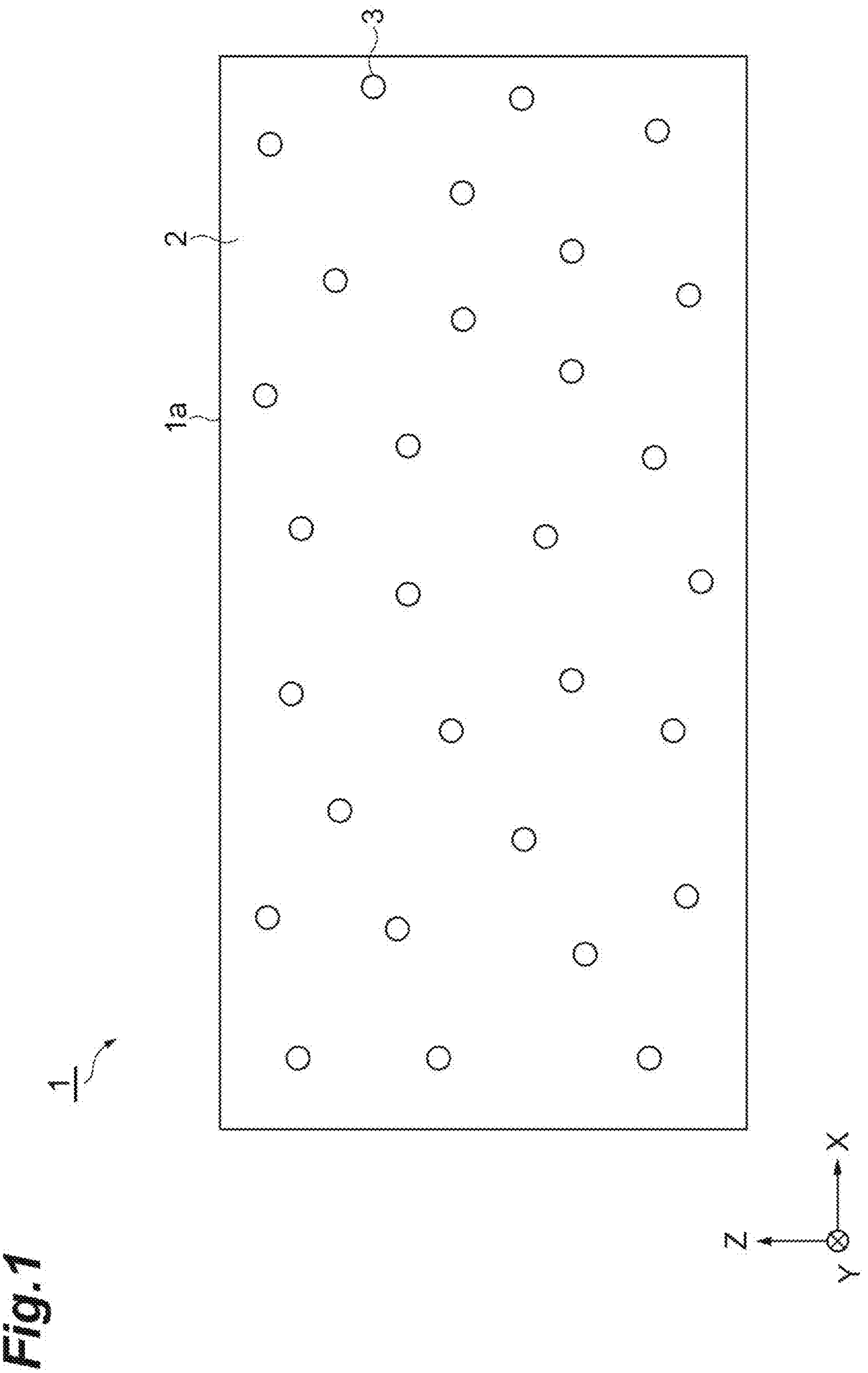
FIG. 1 is a view schematically illustrating a cross-section of a member.

Specific examples of a method for manufacturing resin member and a resin member according to an embodiment of the present disclosure will be described in detail with reference to the drawings. The present invention is not limited to the embodiments to be described below. A technical scope of the present invention is determined on the basis of description of claims. In the description of the drawings, the same elements are denoted by the same reference numerals, and repeated description will be omitted.

A method of manufacturing a resin member according to an embodiment will be described. FIG. 1 is a view schematically illustrating a cross-section of a member 1 used in the manufacturing method. The member 1 is formed from a wood plastic composite (WPC). The wood plastic composite is a composite of a wood powder and a thermoplastic. The wood plastic composite has higher durability in comparison to wood. Using the wood plastic composite is good for an environment because unused biomass such as thinned wood can be utilized. Since an appearance of the wood plastic composite is similar to wood, the wood plastic composite is easily accepted for applications where a large amount of wood has been used from the related art. The member 1 has a surface 1*a*. In the accompanying drawings, an X-direction, a Y-direction, and a Z-direction are shown in combination for easy comprehension. The X-direction, the Y-direction, and the Z-direction are orthogonal to each other. The X-direction and the Y-direction are along the surface 1*a*. The Z-direction is along a normal line of the surface 1*a*, and matches a thickness direction of the member 1.

The member 1 contains a resin 2, a plant powder 3 dispersed in the resin 2, and an admixture (not illustrated). The resin 2 is, for example, a thermoplastic resin. For example, the resin 2 contains at least one material among polypropylene (PP), nylon 6 (PA6), acrylonitrile, butadiene, and styrene copolymer synthetic resin (ABS resin). The plant powder 3 contains, for example, one or both of a wood powder and a bamboo powder. Before performing irradiation with laser light L (refer to FIG. 2) to be described later, a content rate of the plant powder 3 in the member 1 is, for example, 30 wt % or more. The content rate of the plant powder 3 in the member 1 before irradiation with the laser light L may be less than 30 wt %.

A method of preparing the member 1 will be described. First, a mixture containing the resin 2, the plant powder 3, and an admixture is pelletized by using an extruder to prepare pellets. Next, the member 1 is prepared by extrusion molding or injection molding the pellets.

Figure 2:
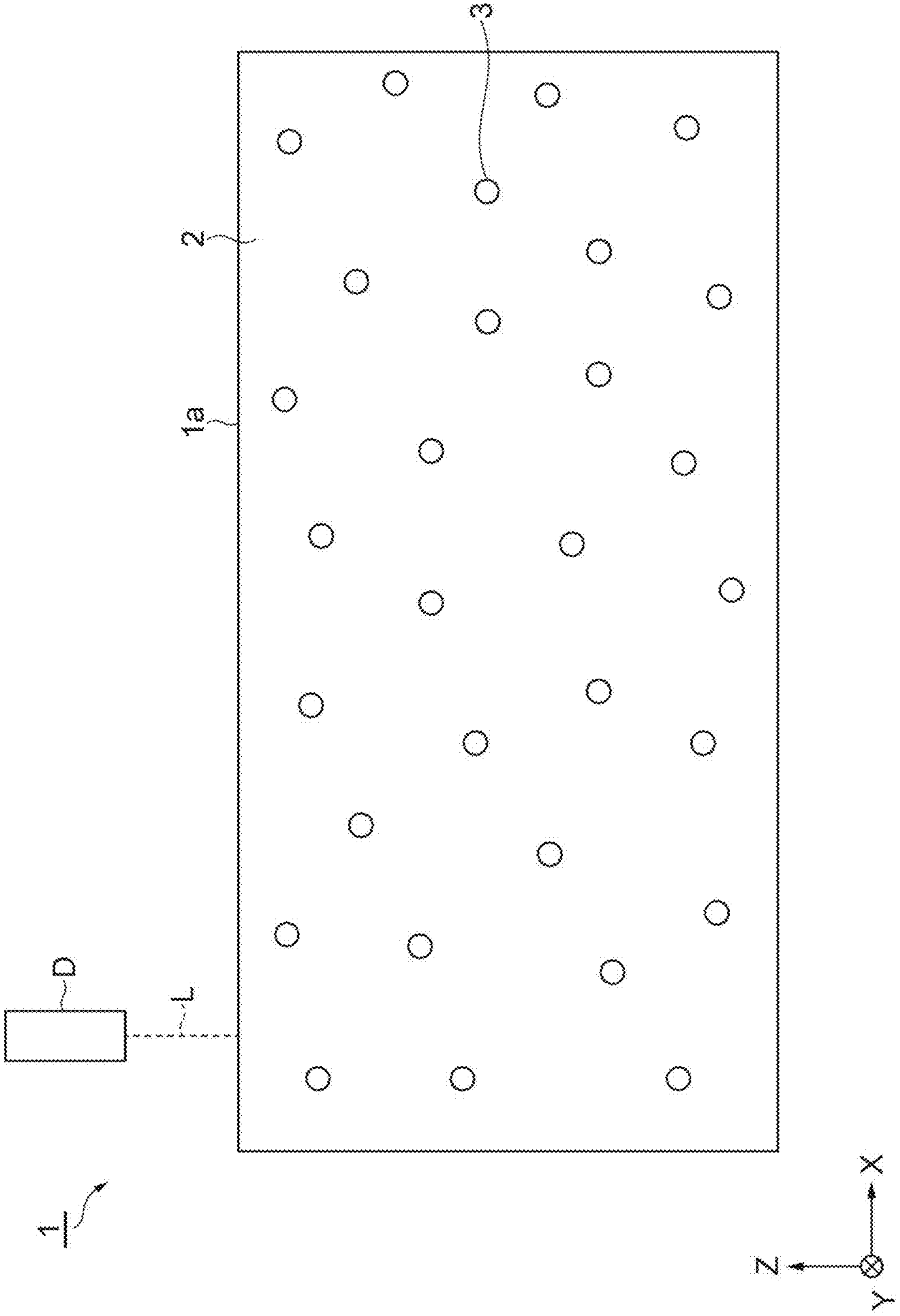
FIG. 2 is a view schematically illustrating a state of irradiating a surface of the member with laser light.

In this embodiment, the surface 1*a* of the member 1 is irradiated with laser light to manufacture a resin member containing diamond-like carbon (DLC) in a surface layer region including the surface 1*a*. FIG. 2 is a view schematically illustrating a state of irradiating the surface 1*a* of the member 1 with laser light L. As illustrated in FIG. 2, the surface 1*a* is irradiated with the laser light L by using a device D. A wavelength of the laser light L is included in, for example, a visible region or an ultraviolet region, and is 150 nm or more and 550 nm or less in an example. The wavelength of the laser light L may be, for example, a wavelength included in a near infrared region such as 1030 nm or 1064 nm. A fluence (the amount of energy per unit area) of the laser light L is, for example, 0.1 $mJ/cm^2$ or more and 5 $mJ/cm^2$ or less. For example, the laser light L is pulsed light. A pulse width (full width at half maximum) of the laser light L is, for example, 100 fs or more and 100 ps or less. In an example, the pulse width of the laser light L is 1.0 ps. The wavelength, the fluence, and the pulse width of the laser light L are not limited to the above-described values and areas.

Figure 3:
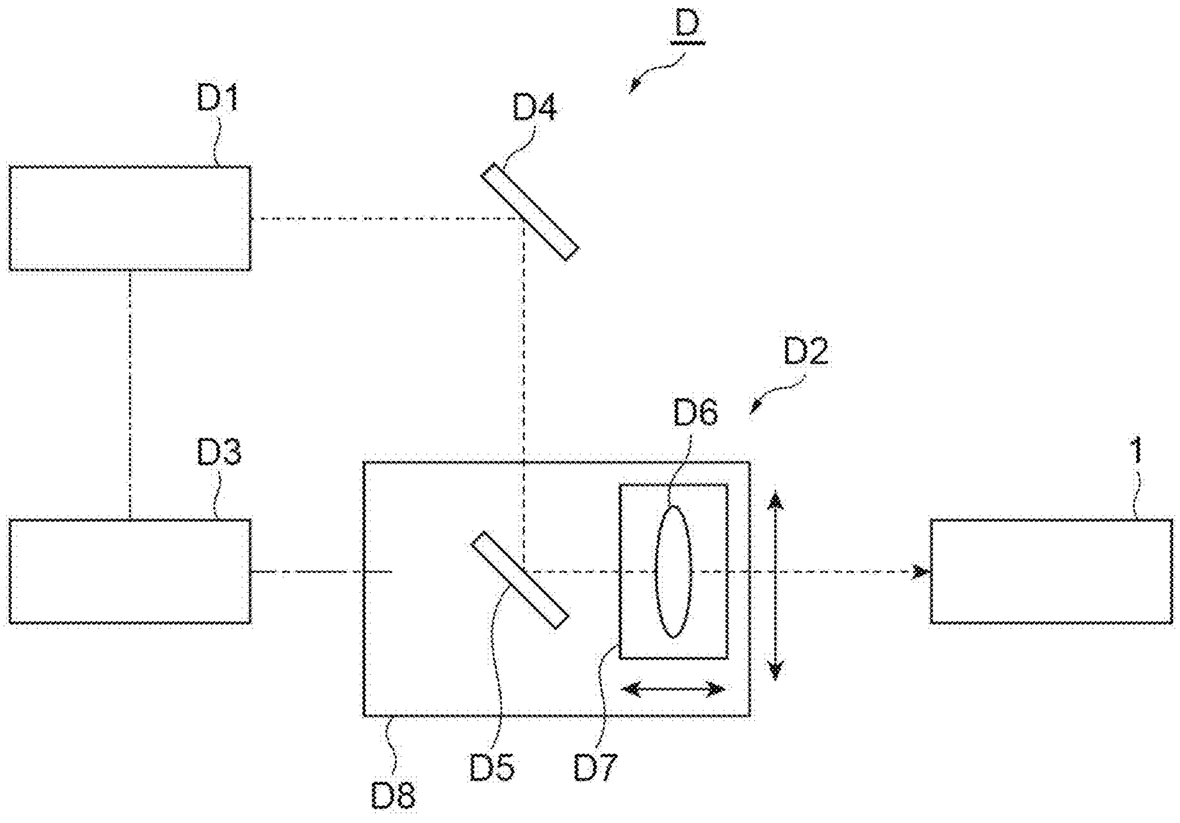
FIG. 3 is a view illustrating a schematic configuration of a device that performs irradiation with laser light.

FIG. 3 is a view illustrating a schematic configuration of the device D. As illustrated in FIG. 3, the device D includes a light source D1, a waveguide optical system D2, a controller D3, and a movable stages D7 and D8. The light source D1 emits the laser light L. The waveguide optical system D2 includes a pair of reflection mirrors D4 and D5, and a condensing lens D6. The reflection mirror D4 reflects the laser light L emitted from the light source D1 toward the reflection mirror D5 at an approximately right angle. The reflection mirror D5 reflects the laser light L reflected from the reflection mirror D4 toward the condensing lens D6 at an approximately right angle. The condensing lens D6 condenses the laser light L reflected from the reflection mirror D5 toward the member 1. The controller D3 is electrically connected to the light source D1 and controls irradiation conditions of the laser light L.

The condensing lens D6 is provided on the movable stage D7. The movable stage D7 and the reflection mirror D5 are provided on the movable stage D8. Any of the operations of the movable stages D7 and D8 are controlled by the controller D3. When the condensing lens D6 is moved in an optical axis direction of the laser light L by the movable stage D7, a condensing position of the laser light L in the optical axis direction is adjusted. When the reflection mirror D5 and the condensing lens D6 are moved in an in-plane direction of the surface 1*a* of the member 1 by the movable stage D8, scanning of the laser light L is performed along the surface 1*a* of the member 1.

Figure 4:
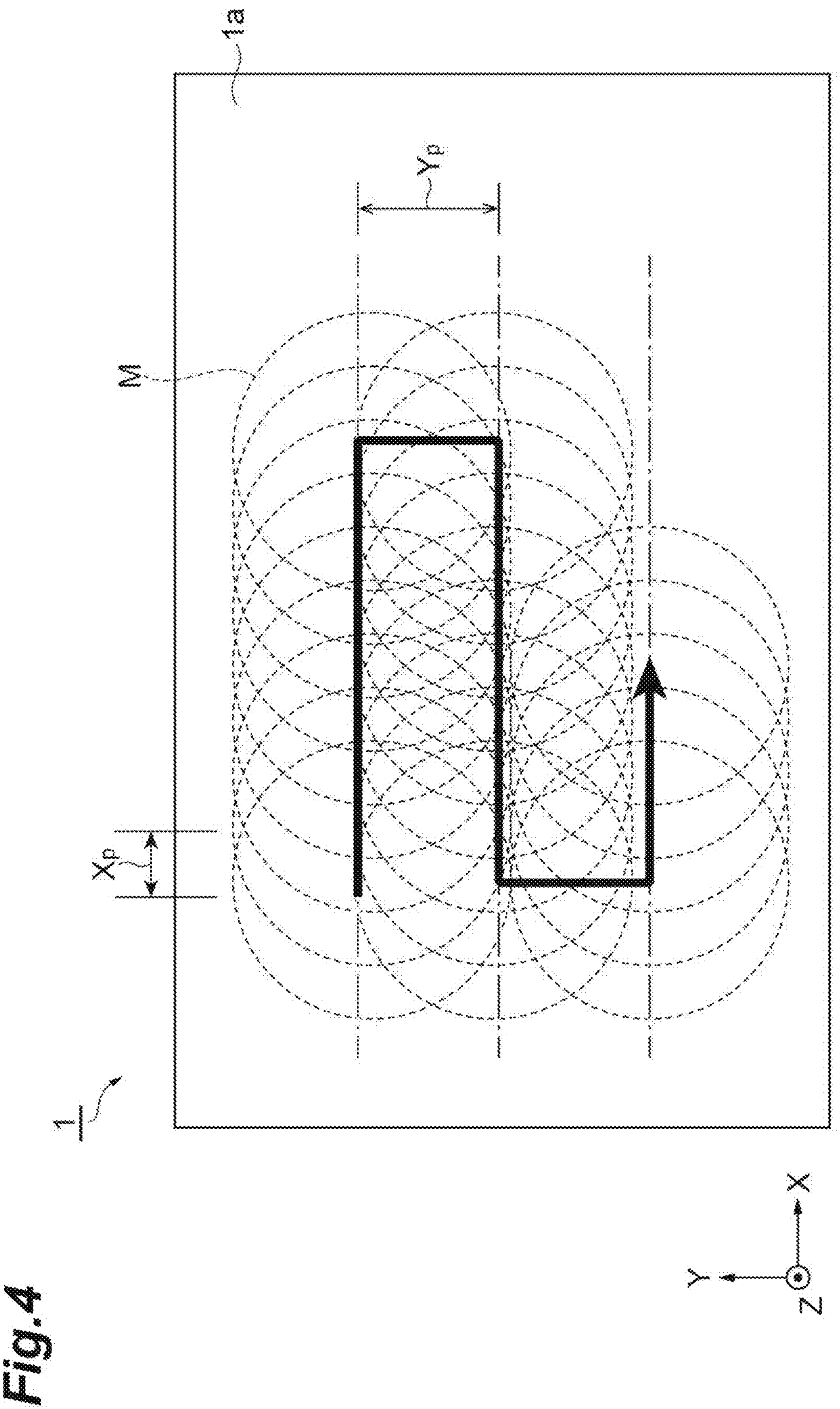
FIG. 4 is a view illustrating an aspect of performing scanning with laser light.

A method of performing scanning with the laser light L will be described. FIG. 4 is a view illustrating an aspect of performing scanning with the laser light L. When irradiating the surface 1*a* with the laser light L, scanning with the laser light L is performed along the surface 1*a* while condensing the laser light L. The surface 1*a* is irradiated with the laser light L in an area M at intermittent timing during scanning. For example, the area M has a circular shape. A diameter of the area M is, for example, 10 μm or more and 1 mm or less. When the movable stage D8 repeats movement and stoppage of the reflection mirror D5 and the condensing lens D6 in the X-direction, irradiation with the laser light L is performed in a processing pitch Xp in the X-direction. The processing pitch Xp is a distance between centers of a plurality of the areas M adjacent to each other in the X-direction. For example, the processing pitch Xp is 25 nm or less, and is 10 nm in an example. The processing pitch Xp may be 1/400 or less times a beam diameter (a diameter of each of the areas M), and may be, for example, 1/70000 times. After scanning with the laser light L by a predetermined distance in the X-direction, the movable stage D8 moves the reflection mirror D5 and the condensing lens D6 by a processing pitch Yp in the Y-direction. For example, the processing pitch Yp is equal to a radius of the area M. When the device D repeats the above-described operation in the X-direction and the Y-direction, uniform irradiation with the laser light L is performed over the entirety of a desired processed portion. The processed portion may be the entirety of the surface 1$a$ or a part of the surface 1$a$.

Figure 5:
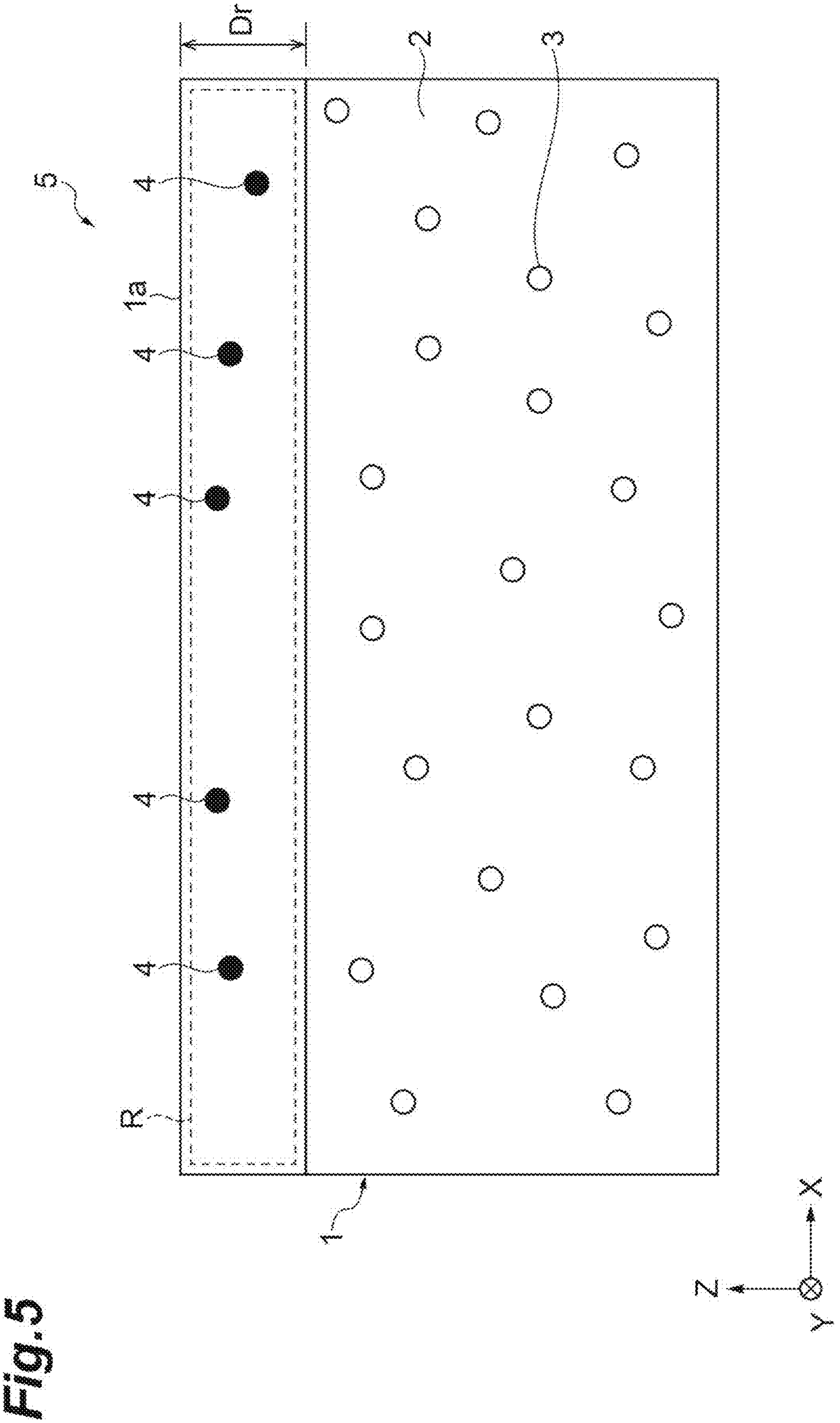
FIG. 5 is a view schematically illustrating a cross-section of a resin member in which diamond-like carbon is formed.

Diamond-like carbon is formed by irradiation with the laser light L with respect to the surface 1$a$ of the member 1. FIG. 5 is a view schematically illustrating a cross-section of a resin member 5 containing a diamond-like carbon 4. As illustrated in FIG. 5, as a result of irradiation with the laser light L with respect to the surface 1$a$, the diamond-like carbon 4 is dispersed and formed in the resin 2 in a surface layer region R of the member 1. The surface layer region R is a region that includes the surface 1$a$ and has a certain depth Dr in a thickness direction (Z-direction) of the member 1 from the surface 1$a$. It is considered that the diamond-like carbon 4 is formed when the plant powder 3 or both the resin 2 and the plant powder 3 are changed (for example, carbonized) due to irradiation with the laser light L. The diamond-like carbon 4 may be formed through change of only the plant powder 3 due to irradiation with the laser light L, or may be formed through change of the plant powder 3 and the resin 2 at the periphery of the plant powder 3 due to irradiation with the laser light L. The surface layer region R may mainly include the diamond-like carbon 4. In other words, a volume ratio of the diamond-like carbon 4 may be the largest among volume ratios of the resin 2, the plant powder 3, and the diamond-like carbon 4 contained in the surface layer region R. For example, a lower limit value of the depth Dr from the surface 1$a$ of the surface layer region R is 100 μm. For example, an upper limit value of the depth Dr is 500 μm.

A content rate of the plant powder 3 in a region where the plant powder 3 is not changed into the diamond-like carbon 4, in other words, in other regions other than the surface layer region R in the resin member 5 is equal to the content rate of the plant powder 3 in the member 1 before irradiation with the laser light L, and is, for example, 30 wt % or more. Even in the resin member 5 after being irradiated with the laser light L, the plant powder 3 includes one or both of a wood powder and a bamboo powder, and the resin 2 includes at least one material among polypropylene, nylon 6, and an ABS resin.

Effects obtained by the method of manufacturing the resin member 5 according to this embodiment, and the resin member 5 will be described. In the method of manufacturing the resin member 5 according to this embodiment, the surface 1$a$ of the member 1 containing the resin 2 and the plant powder 3 dispersed in the resin 2 is irradiated with the laser light L. As a result of this, in the surface layer region R including the surface 1$a$ of the member 1, at least the plant powder 3 between the resin 2 and the plant powder 3 is changed into the diamond-like carbon 4.

In the method of manufacturing the resin member 5, the plant powder 3 is changed (for example, carbonized) due to irradiation with the laser light L, and the diamond-like carbon 4 is generated. In general, the plant powder contains lignin in addition to cellulose, and it is considered that the lignin contributes to generation of the diamond-like carbon 4. In the method, the plant powder 3 existing already in a region ranging from the surface 1$a$ of the member 1 to the inside thereof is changed into the diamond-like carbon 4 differently from a method of depositing a diamond-like carbon film on a surface of a resin member by CVD method or the like. In this case, the quality of the generated diamond-like carbon 4 is hardly affected by roughness of the surface 1$a$ of the member 1. Accordingly, according to the manufacturing method, in the resin member 5 containing the diamond-like carbon 4 in the surface layer region R, a deviation in the quality of the diamond-like carbon 4 due to roughness of the surface 1$a$ of the member 1 can be reduced. In addition, since the plant powder 3 existing already in the region ranging from the surface 1$a$ of the member 1 to the inside thereof is changed into the diamond-like carbon 4, the diamond-like carbon 4 is less likely to be peeled off from the resin member 5 in comparison to a case of forming a diamond-like carbon film, for example, by a CVD method or the like. Particularly, for example, in a case where a stress is applied to the resin member 5 for industrial applications over a long period of time, there is a concern that the diamond-like carbon film formed by the CVD method or the like is peeled off. In the method of manufacturing the resin member 5, since the diamond-like carbon 4 is less likely to be peeled off from the resin member 5, it is possible to expect that an effect of preventing corrosion or abrasion is exhibited over a long period of time. The CVD method has an advantage that the diamond-like carbon film can be simultaneously formed over a wide area of a surface of a material, and is widely used in the related art, but according to the present disclosure, a product with high reliability can be realized.

The resin member 5 according to this embodiment is a resin member including the surface 1$a$, and contains the resin 2, the plant powder 3 dispersed in the resin 2, and the diamond-like carbon 4 dispersed in the surface layer region R in the resin 2 including the surface 1$a$. Since the resin member 5 contains the diamond-like carbon 4 dispersed in the surface layer region R including the surface 1$a$, the resin member 5 is less likely to be corroded and abraded. In addition, the resin member 5 can be easily prepared by changing, for example, the plant powder 3 dispersed in the surface layer region R of the member 1 into the diamond-like carbon 4. Accordingly, it is possible to provide the resin member 5 in which a deviation in the quality of the diamond-like carbon 4 due to roughness of the surface 1$a$ of the member 1 is reduced.

As in this embodiment, in the method of manufacturing the resin member 5, the wavelength of the laser light L may be 550 nm or less, and the fluence of the laser light L may be 0.1 mJ/cm$^2$ or more. According to this, sufficient energy can be applied to the plant powder 3 contained in the member 1. Accordingly, the diamond-like carbon 4 is formed in a satisfactory manner.

As in this embodiment, in the method of manufacturing the resin member 5, the laser light L may be pulsed light, and the pulse width of the laser light L may be 100 ps or less. According to this, energy can be sufficiently applied to the plant powder 3 contained in the member 1. Accordingly, the diamond-like carbon 4 is formed in a satisfactory manner.

As in this embodiment, in the method of manufacturing the resin member 5, the content rate of the plant powder 3 in the member 1 before irradiation with the laser light L may be 30 wt % or more. Similarly, in the resin member 5, the content rate of the plant powder 3 in other regions in the resin 2 other than the surface layer region R may be 30 wt % or more. As illustrated in the following Example 5, when the content rate of the plant powder 3 is 30 wt % or more, energy necessary for the laser light L can be significantly reduced in comparison to a case where the content rate of the plant powder 3 is less than 30 wt %.

As in this embodiment, in the method of manufacturing the resin member 5, and the resin member 5, the plant powder 3 may include one or both of a wood powder and a bamboo powder. As described in the following example, for example, in this case, the plant powder 3 can be changed into the diamond-like carbon 4.

As in this embodiment, in the method of manufacturing the resin member 5, and the resin member 5, the resin 2 may include at least one material among polypropylene, nylon 6, and an ABS resin. As described in the following example, for example, in this case, the plant powder 3 can be changed into the diamond-like carbon 4.

As in this embodiment, in the method of manufacturing the resin member 5, when irradiating the surface 1*a* of the member 1 with the laser light L, scanning with the laser light L may be performed along the surface 1*a* while condensing the laser light L. In this case, the diamond-like carbon 4 can be formed in a desired area while raising an energy density of the laser light L.

As in this embodiment, the surface layer region R of the resin member 5 may mainly contain the diamond-like carbon 4. In this case, the resin member 5 is further less likely to be corroded and abraded.

Hereinafter, examples of this embodiment will be described. In the following examples, the resin member 5 of this embodiment was actually manufactured. As the light source D1, an ultrashort pulse solid-state laser (MOIL, manufactured by HAMAMATSU PHOTONICS K.K.) having a wavelength of 515 nm, a pulse width of 1.0 ps, and a repetition frequency of 100 kHz was used unless particularly described. A focal distance of the condensing lens D6 was 20 mm, and a numerical aperture (NA) was 0.25. The surface 1*a* was disposed at a position deviating from a best focus position of the condensing lens D6 by −500 μm in the Z-direction, and thus a beam diameter of the laser light L on the surface 1*a* was set to 727 μm.

Example 1

Figure 6A:
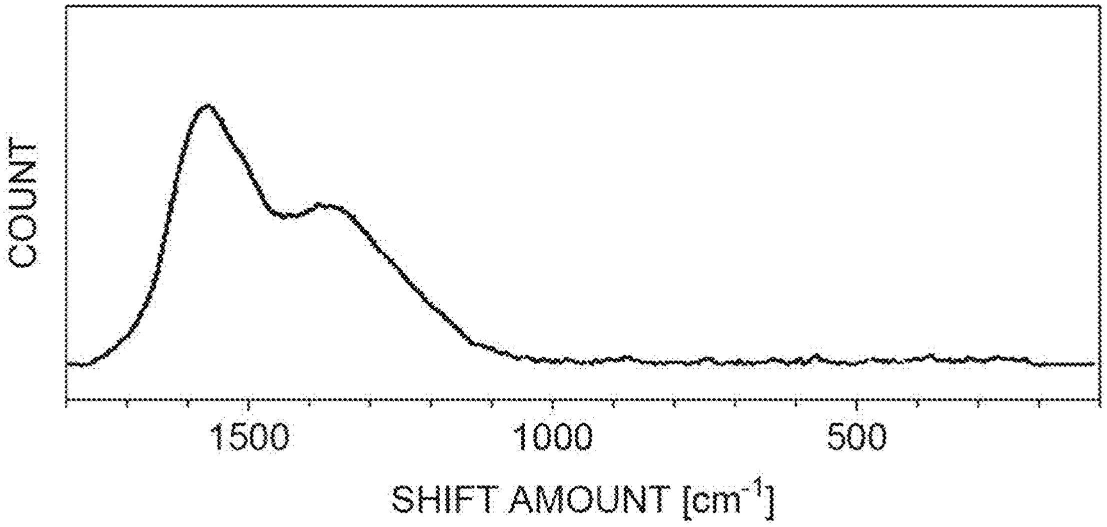
FIG. 6A is a graph illustrating analysis results when performing Raman spectroscopy on the diamond-like carbon.
Figure 6B:
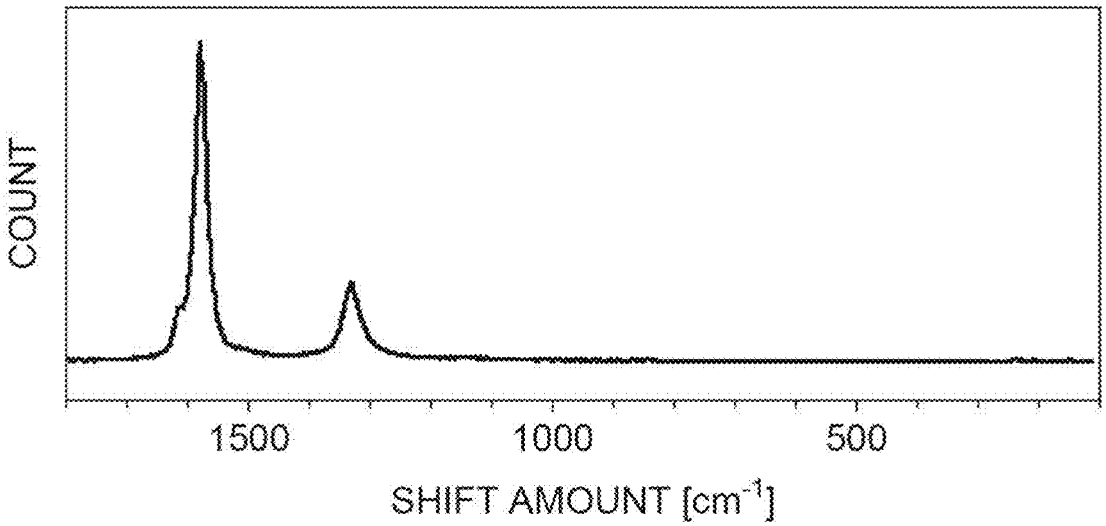
FIG. 6B is a graph illustrating analysis results when performing Raman spectroscopy on graphite.

First, typical results when performing Raman spectroscopy on diamond-like carbon and graphite will be described with reference to FIGS. 6A and 6B. FIG. 6A is a graph illustrating analysis results when performing the Raman spectroscopy on the diamond-like carbon. FIG. 6B is a graph illustrating analysis results when performing the Raman spectroscopy on the graphite. As illustrated in FIG. 6A, when performing the Raman spectroscopy on the diamond-like carbon, a waveform having two peaks near a shift amount of 1300 $cm^{-1}$ or more and 1600 $cm^{-1}$ or less is detected. On the other hand, as illustrated in FIG. 6B, when performing the Raman spectroscopy on the graphite, a sharp peak is detected only near a shift amount of 1300 and near a shift amount of 1600 $cm^{-1}$.

Figure 7:
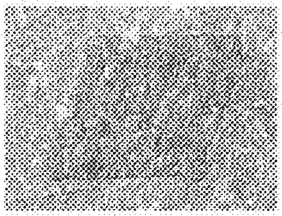
FIG. 7 is a view illustrating irradiation conditions of laser light and images of a surface of a member after being irradiated with the laser light.
Figure 7:
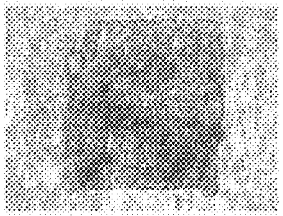
Figure 8:
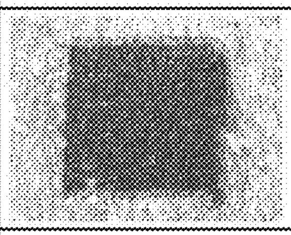
FIG. 8 is a view illustrating irradiation conditions of laser light and images of a surface of a member after being irradiated with the laser light.
Figure 8:
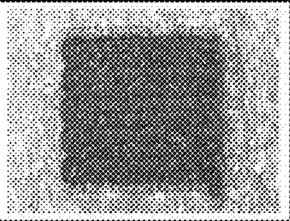
Figure 8:
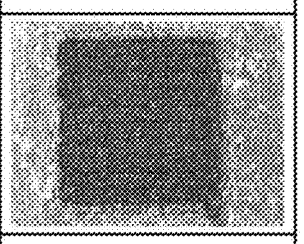

On the basis of the above-described characteristics in the Raman spectroscopy, formation of the diamond-like carbon 4 when changing irradiation conditions of the laser light L will be described with reference to FIGS. 7, 8, 9A, 9B, 9C, 10A, 10B, and 10C. FIGS. 7 and 8 are views illustrating irradiation conditions of the laser light L and images of the surface 1*a* of the member 1 after being irradiated with the laser light L. FIGS. 9A, 9B, 9C, 10A, 10B, and 10C show analysis results when performing the Raman spectroscopy on a processed portion irradiated with the laser light L. In FIGS. 9A, 9B, 9C, 10A, 10B, and 10C, analysis results of three points included within an area of the member 1 irradiated with the laser light L are shown. In this example, a member 1 that contains polypropylene (PP) as the resin 2, and contains a wood powder as the plant powder 3 was used. A content rate of the wood powder was 60 wt %. Irradiation with the laser light L was performed at a processing rate of 0.1 mm/s. In FIGS. 7 and 8, a processing portion height represents a height of a surface of a processed portion with a surface of a portion not irradiated with the laser light L set as a reference. An average output represents an energy average value per unit time of the laser light L. Pulse energy represents an energy per single pulse of the laser light L. A beam diameter represents a diameter of the laser light L on the surface 1*a* of the member 1. An irradiation intensity represents an average output per unit area of the laser light L on the surface 1*a* of the member 1. A fluence represents pulse energy per unit area of the laser light L on the surface 1*a* of the member 1. A processing pitch (X) represents a processing pitch Xp in the X-direction. A processing pitch (Y) represents a processing pitch Yp in the Y-direction.

Figure 9A:
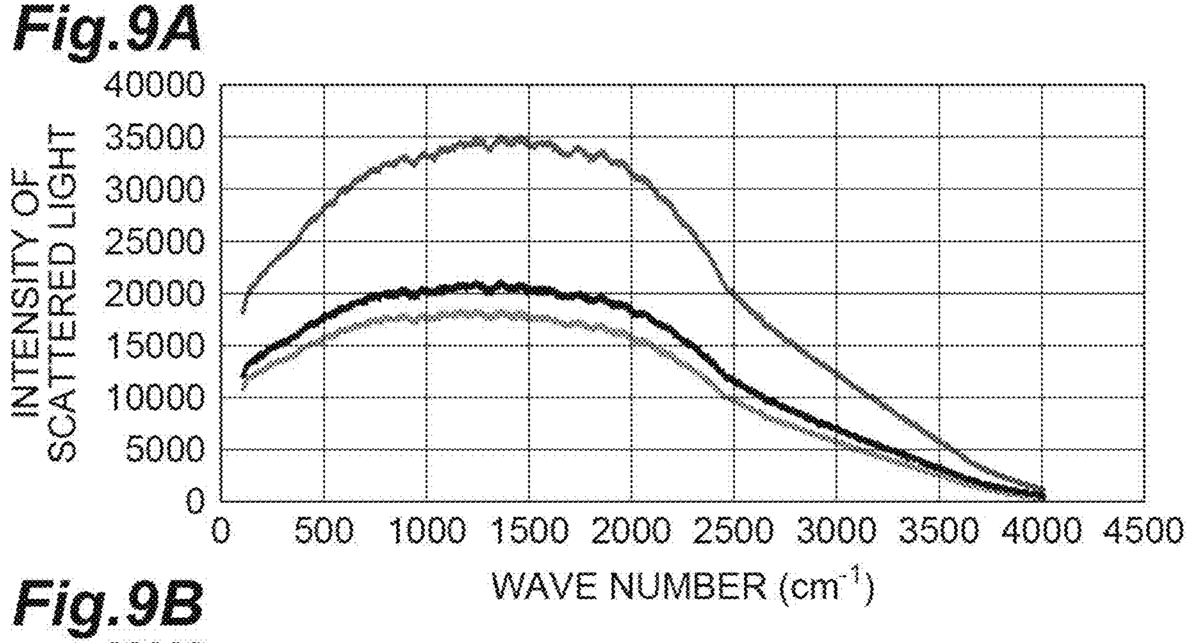
FIGS. 9A, 9B, and 9C are views illustrating analysis results when performing Raman spectroscopy on a processed portion irradiated with laser light in Test Nos. 1 to 3, respectively.
Figure 9B:
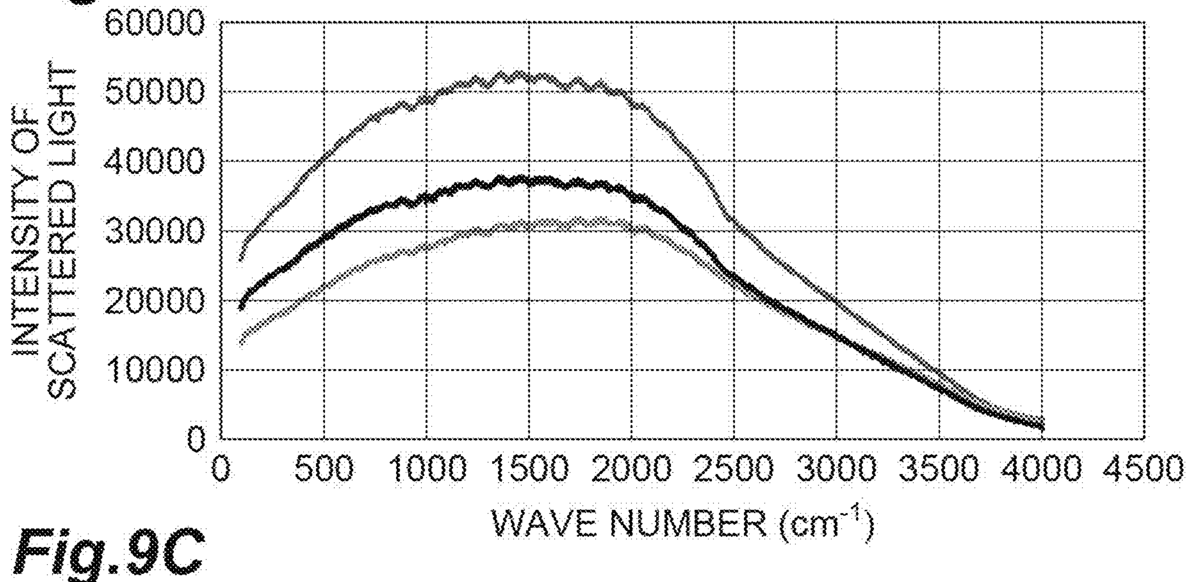

FIGS. 9A and 9B are views illustrating analysis results when performing the Raman spectroscopy on a processed portion (each three points) irradiated with the laser light L in Test Nos. 1 and 2 in FIG. 7, respectively. As illustrated in FIGS. 9A and 9B, in Test Nos. 1 and 2, a peak shape similar to FIG. 6A was not found, and the diamond-like carbon 4 could not be confirmed.

Figure 9C:
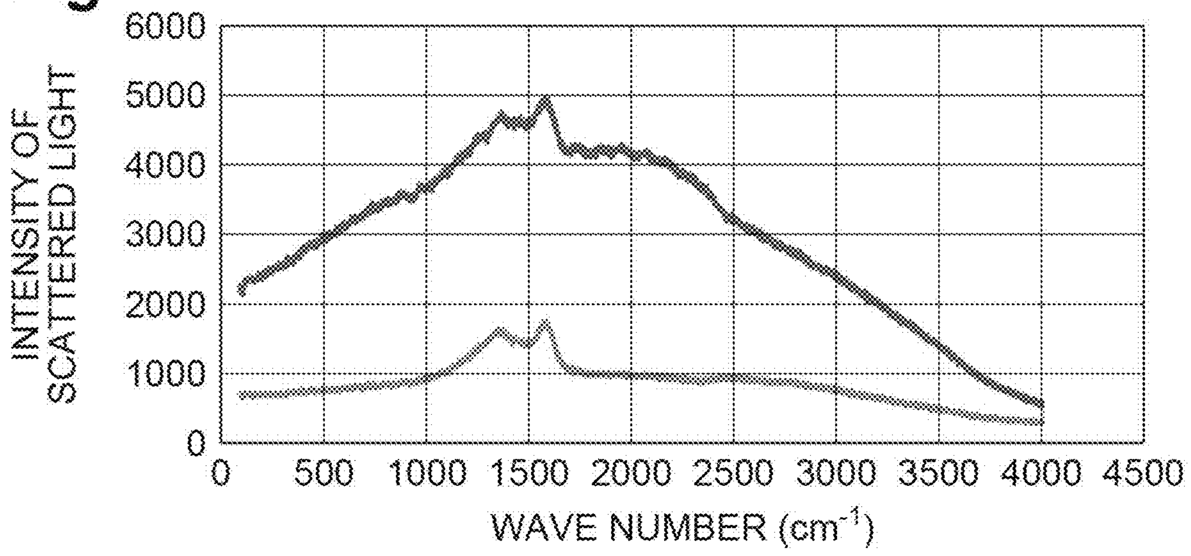
Figure 10A:
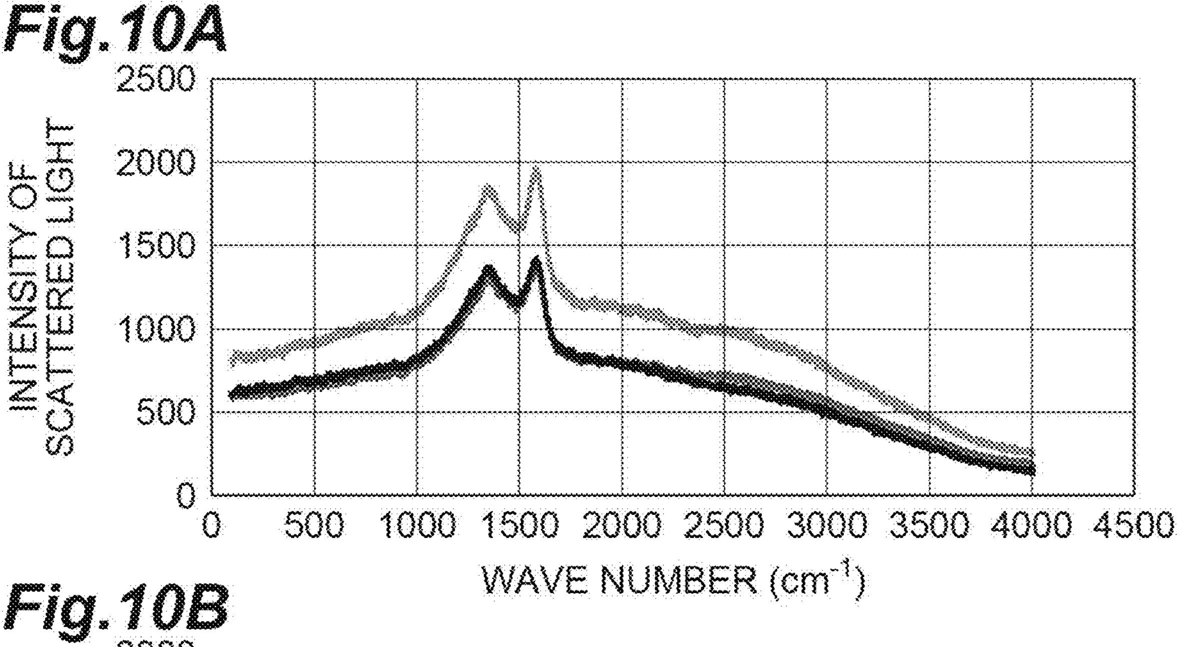
FIGS. 10A and 10B are views illustrating analysis results when performing Raman spectroscopy on a processed portion irradiated with laser light in Test Nos. 4 and 5, respectively.
Figure 10B:
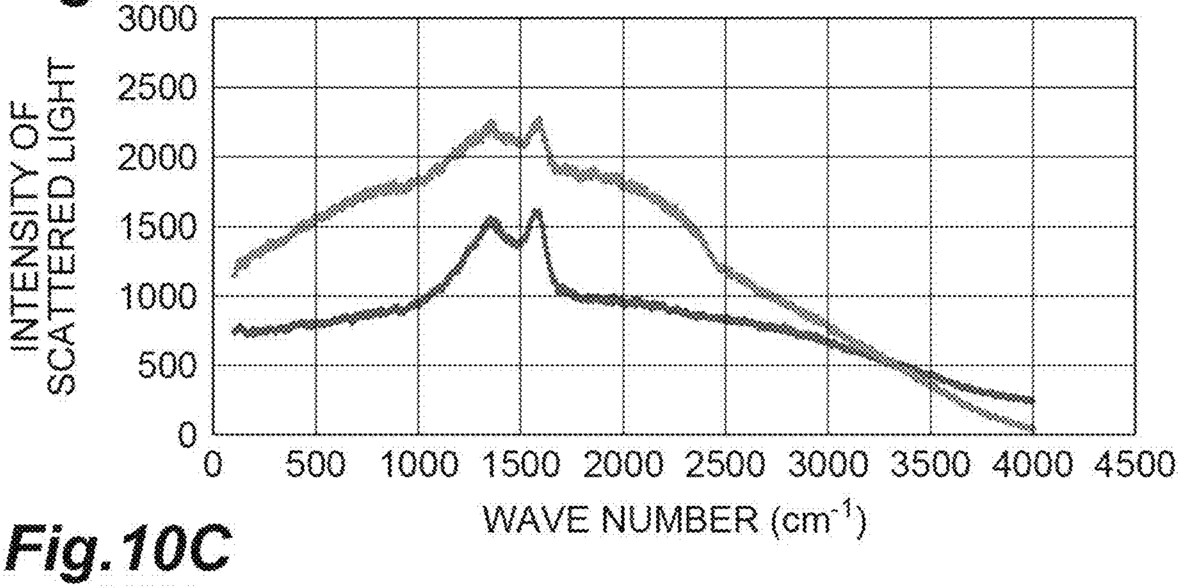

FIGS. 9C, 10A, and 10B are views illustrating analysis results when performing the Raman spectroscopy on a processed portion (each three points) irradiated with the laser light L in Test Nos. 3, 4, and 5 in FIG. 8. In the drawings, since a peak shape similar to FIG. 6A was observed, it could be confirmed that the diamond-like carbon 4 was formed in Test Nos. 3, 4, and 5.

Figure 10C:
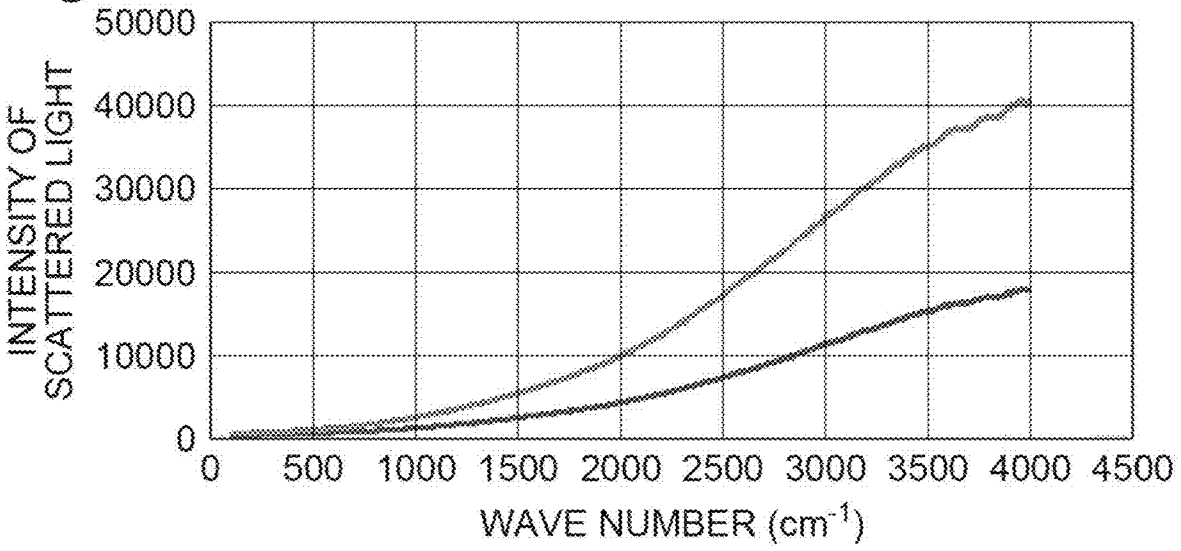
FIG. 10C is a view illustrating analysis results when performing Raman spectroscopy on a portion not irradiated with laser light in the member used in Test Nos. 1 to 5.

FIG. 10C is a view illustrating analysis results when performing the Raman spectroscopy on a portion not irradiated with the laser light L in the member 1 used in Test Nos. 1 to 5 for comparison. In FIG. 10C, since a peak shape similar to FIG. 6A was absolutely not observed, it could be seen that the diamond-like carbon 4 was not formed in the portion not irradiated with the laser light L. The reason why a background shape in FIG. 10C is different from other drawings is because a wavelength of light used in the Raman spectroscopy is different from other wavelengths.

Example 2

Figure 11:
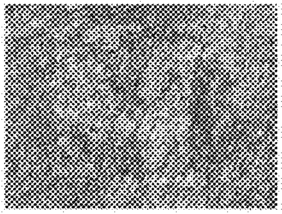
FIG. 11 is a view illustrating irradiation conditions of laser light and images of the surface of the member after being irradiated with laser light.
Figure 11:
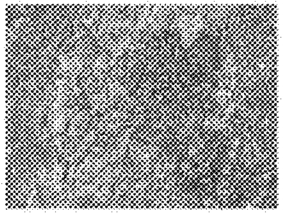
Figure 11:
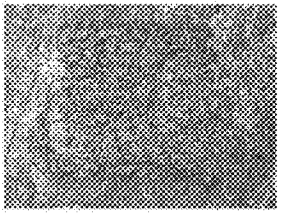
Figure 12:
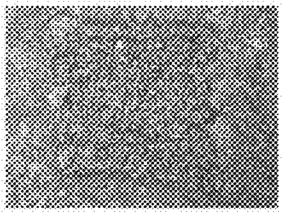
FIG. 12 is a view illustrating irradiation conditions of laser light and images of the surface of the member after being irradiated with laser light.
Figure 12:
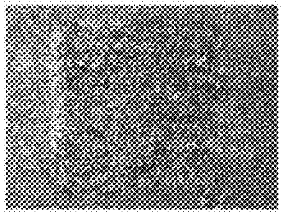
Figure 12:
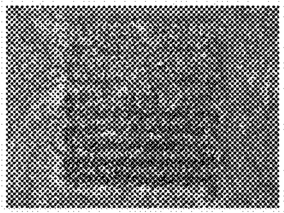
Figure 12:
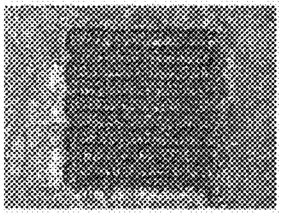
Figure 13A:
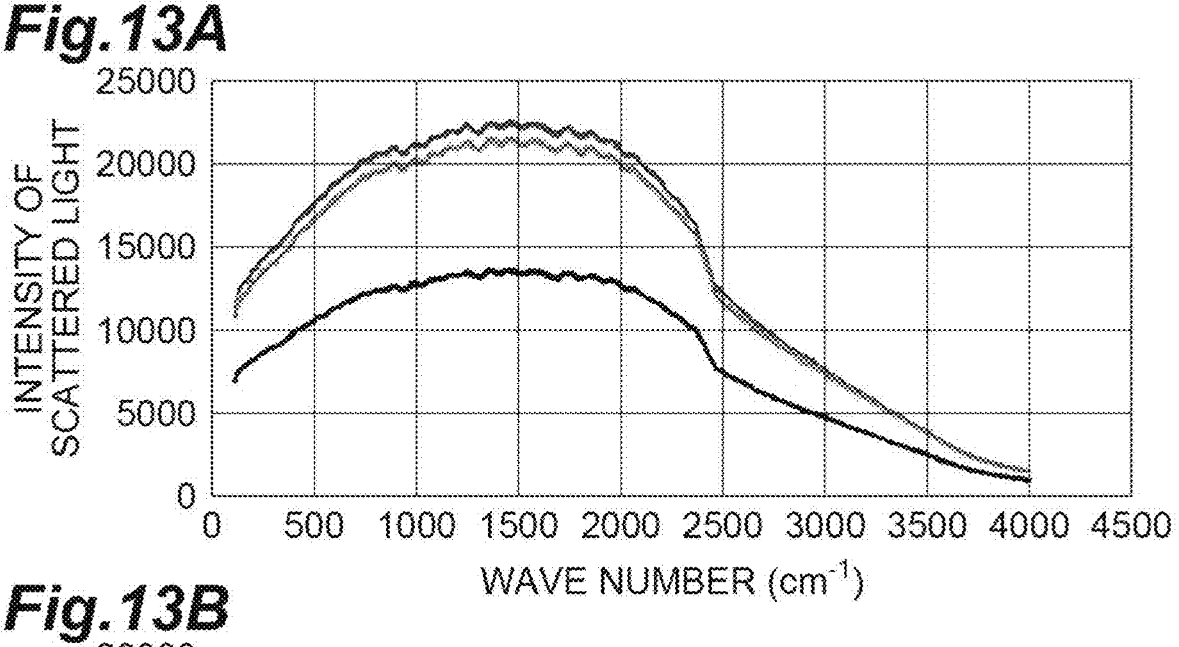
FIGS. 13A, 13B, and 13C are views illustrating analysis results when performing Raman spectroscopy on a processed portion irradiated with laser light in Test Nos. 6 to 8, respectively.
Figure 13B:
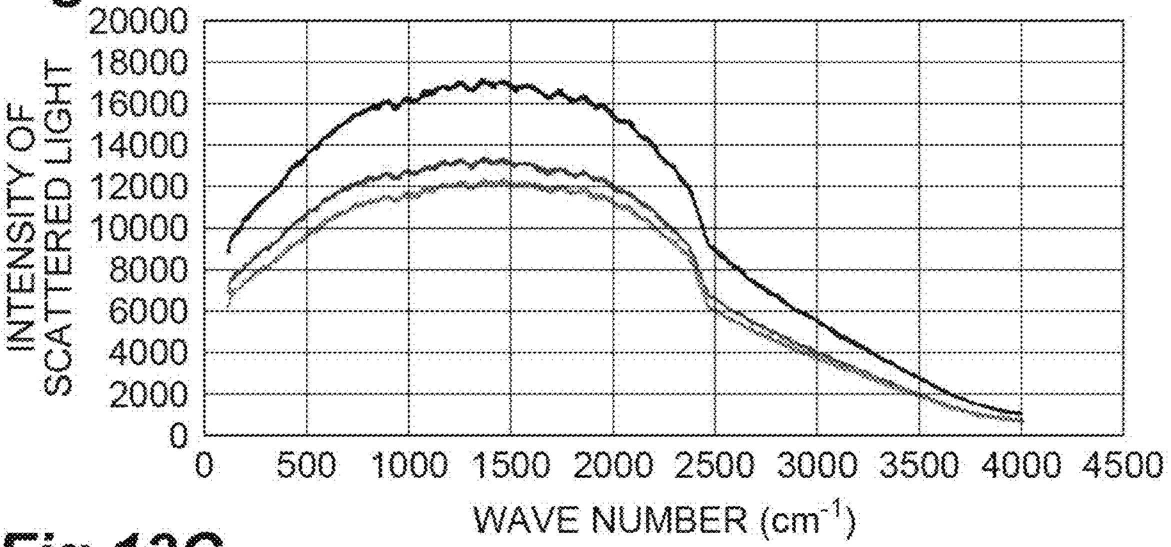
Figure 13C:
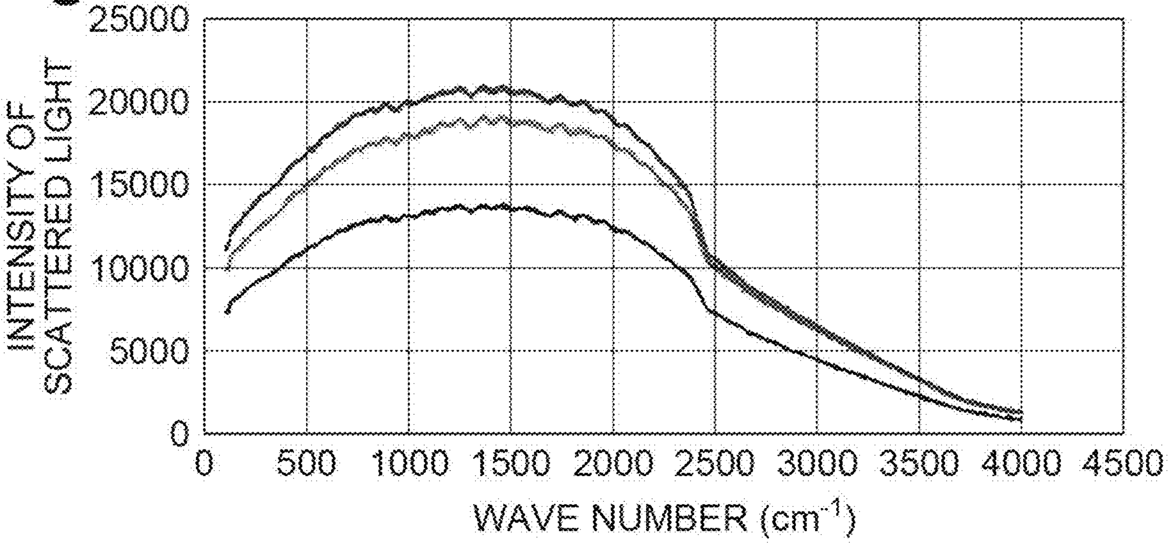
Figure 14A:
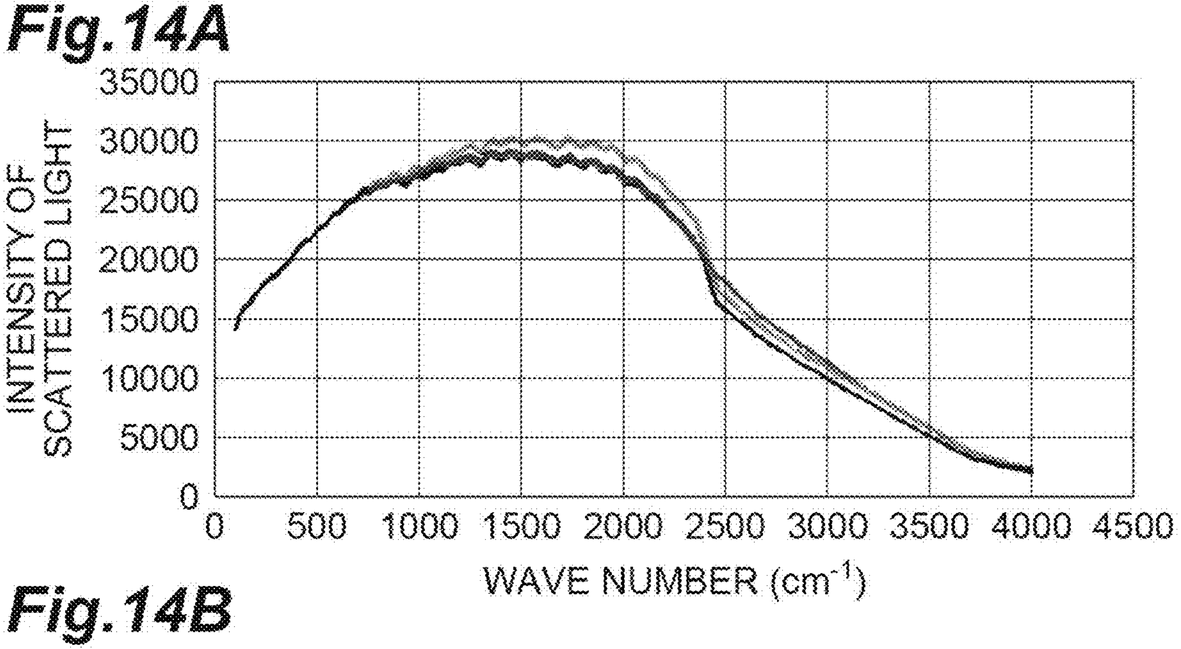
FIGS. 14A, 14B, and 14C are views illustrating analysis results when performing Raman spectroscopy on a processed portion irradiated with laser light in Test Nos. 9 to 11, respectively.
Figure 14B:
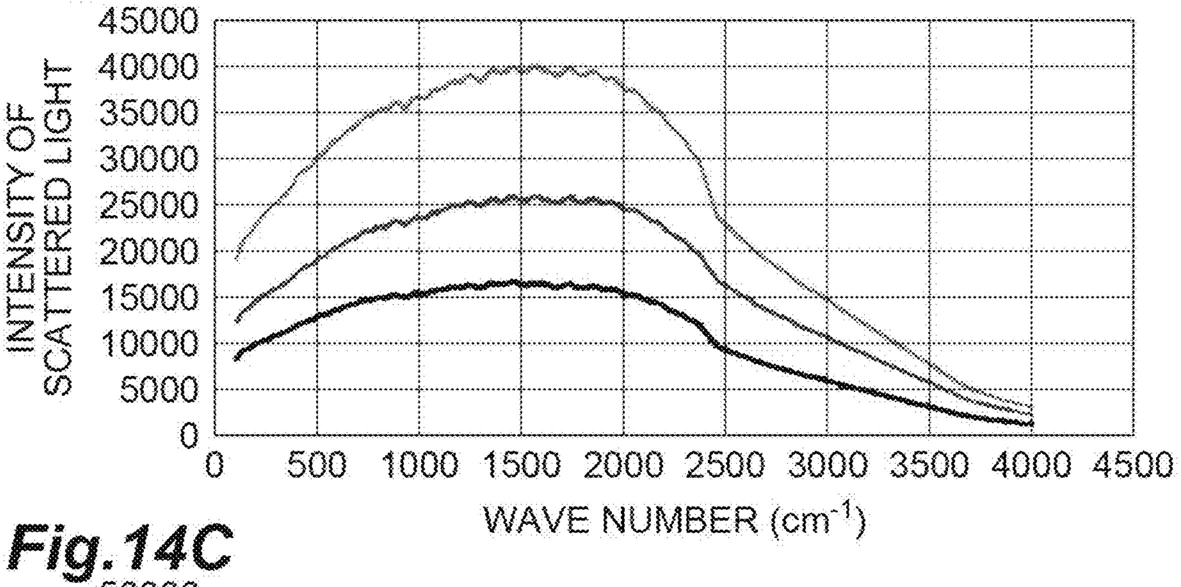
Figure 14C:
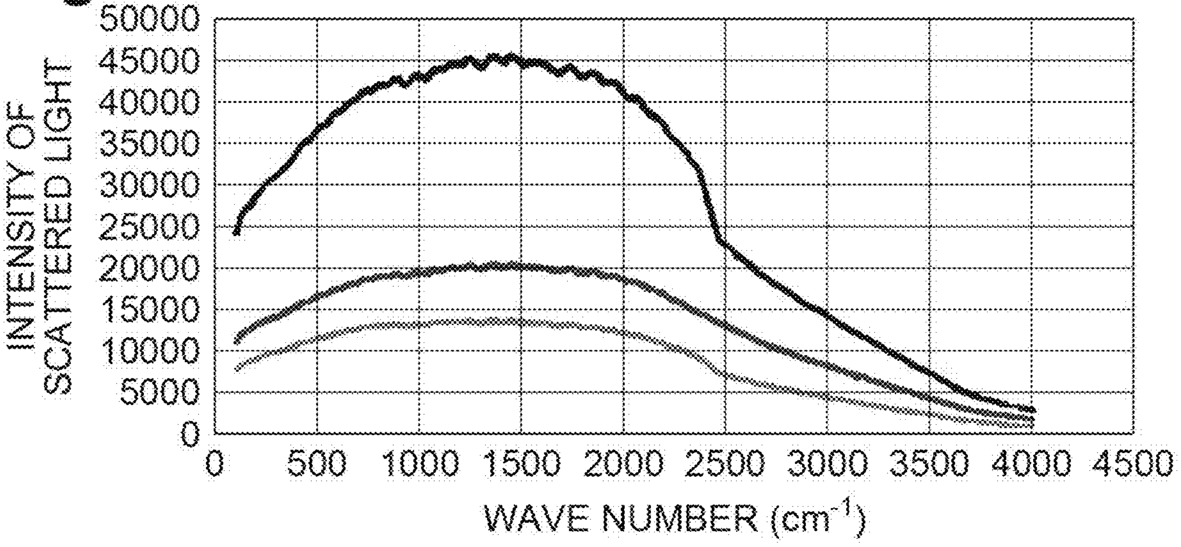

Next, formation of the diamond-like carbon 4 when changing a material of the resin 2 and irradiation conditions of the laser light L will be described with reference to FIGS. 11, 12, 13A, 13B, 13C, 14A, 14B, 14C, 15A, and 15B. FIGS. 11 and 12 are views illustrating irradiation conditions of the laser light L, and images of a surface 1*a* of the member 1 after being irradiated with the laser light L. FIGS. 13A, 13B, 13C, 14A, 14B, 14C, 15A, and 15B show analysis results when performing the Raman spectroscopy on a processed portion of the member 1 irradiated with the laser light L. In FIGS. 13A, 13B, 13C, 14A, 14B, 14C, 15A, and 15B, analysis results of three points included in a portion irradiated with the laser light L in the resin member 5 are shown. In this example, a member 1 containing ABS as the resin 2, and a wood powder as the plant powder 3 was used. A content rate of the wood powder in the member 1 was 50 wt %. Irradiation with the laser light L was performed at a processing rate of 0.1 mm/s. In FIGS. 11 and 12, definitions of a processing portion height, an average output, pulse energy, a beam diameter, an irradiation intensity, a fluence, a processing pitch (X), and a processing pitch (Y) are as in FIGS. 7 and 8 described above.

FIGS. 13A, 13B, 13C, 14A, 14B, and 14C are views illustrating analysis results when performing the Raman spectroscopy on a processed portion irradiated with the laser light L in Test Nos. 6 to 11, respectively. As illustrated in the drawings, in Test Nos. 6 to 11, a peak shape similar to FIG. 6A was not found, and the diamond-like carbon 4 could not be confirmed.

Figure 15A:
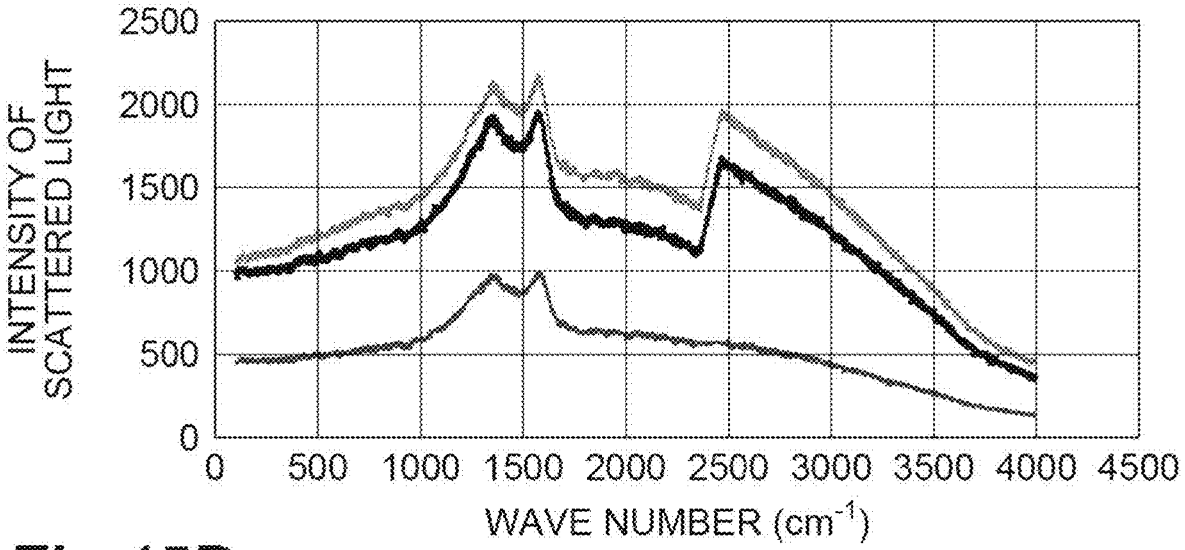
FIG. 15A is a view illustrating analysis results when performing Raman spectroscopy on a processed portion irradiated with laser light in Test No. 12.

FIG. 15A is a view illustrating analysis results when performing the Raman spectroscopy on a processed portion irradiated with the laser light L in Test No. 12. In FIG. 15A, since a peak shape similar to FIG. 6A was observed, it could be confirmed that the diamond-like carbon 4 was formed in Test No. 12. In FIG. 15A, the reason why a waveform near a wave number of 2400 cm is discontinuous is because a region in which the wave number is larger than 2400 cm and a region in which the wave number is smaller than 2400 cm were measured separately, and there was a variation in the background with the passage of time.

Figure 15B:
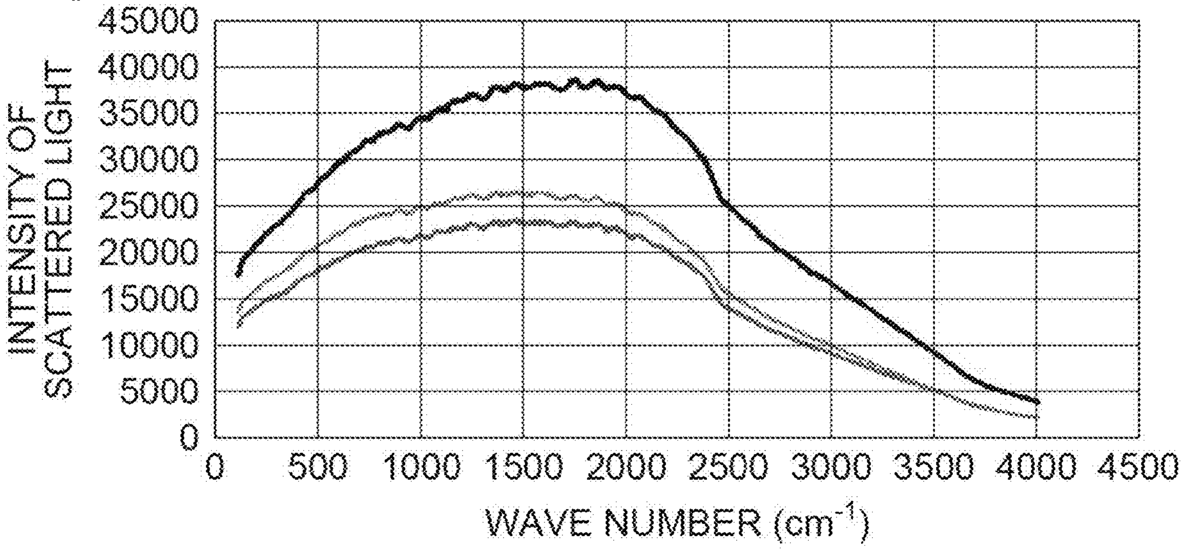
FIG. 15B is a view illustrating analysis results when performing Raman spectroscopy on a portion not irradiated with laser light in the member used in Test Nos. 6 to 12.

FIG. 15B is a view illustrating analysis results when performing the Raman spectroscopy on a portion not irradiated with the laser light L in the member 1 used in Test Nos. 6 to 12 for comparison. In FIG. 15B, since a peak shape similar to FIG. 6A was absolutely not observed, it could be seen that the diamond-like carbon 4 was not formed in the portion not irradiated with the laser light L.

Example 3

Figure 16:
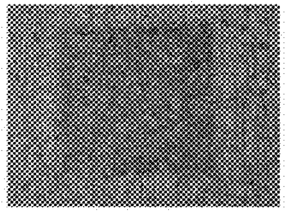
FIG. 16 is a view illustrating irradiation conditions of laser light and images of the surface of the member after being irradiated with laser light.
Figure 16:
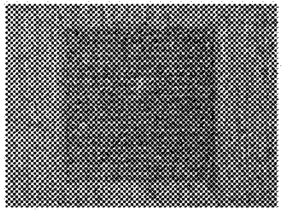
Figure 16:
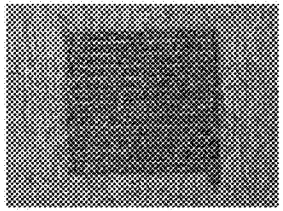
Figure 17:
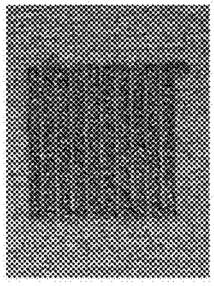
FIG. 17 is a view illustrating irradiation conditions of laser light and images of the surface of the member after being irradiated with laser light.
Figure 17:
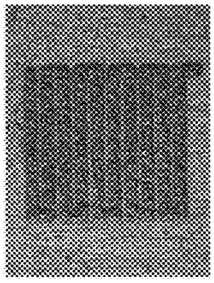
Figure 17:
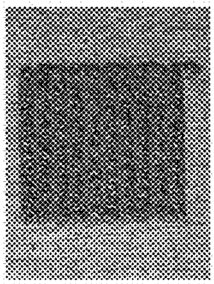
Figure 17:
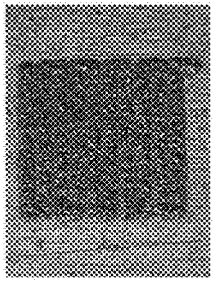
Figure 18A:
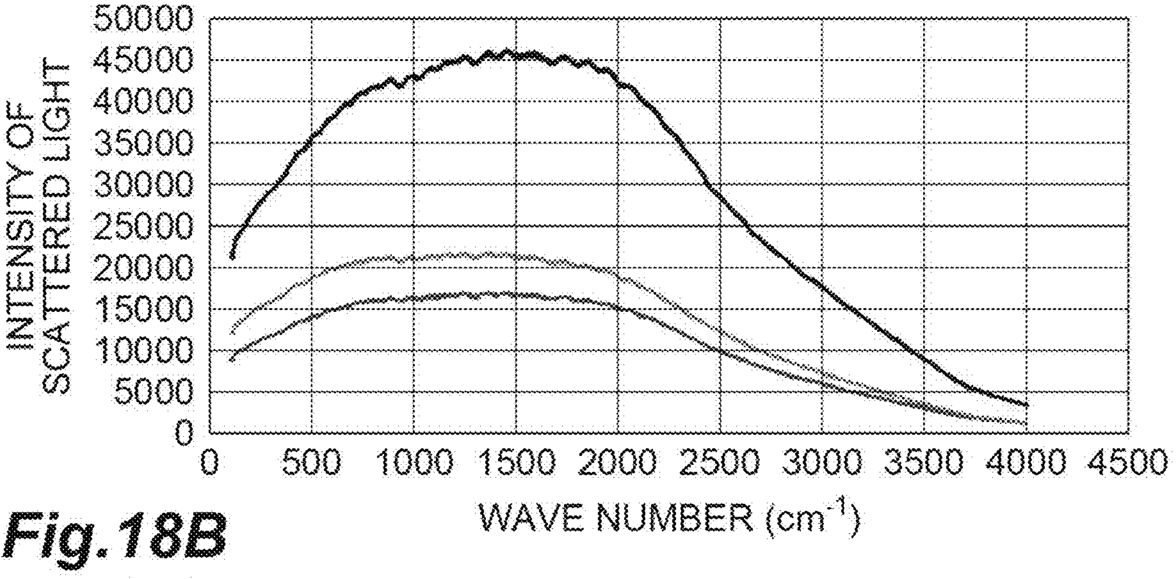
FIGS. 18A, 18B, and 18C are views illustrating analysis results when performing Raman spectroscopy on a processed portion irradiated with laser light in Test Nos. 13 to 15, respectively.
Figure 18B:
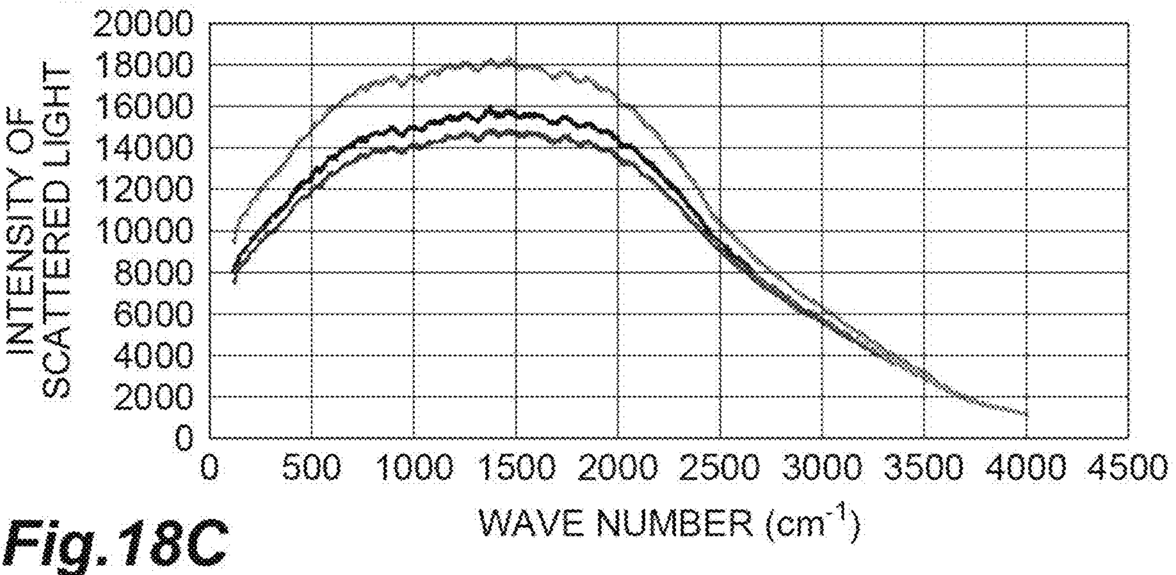
Figure 18C:
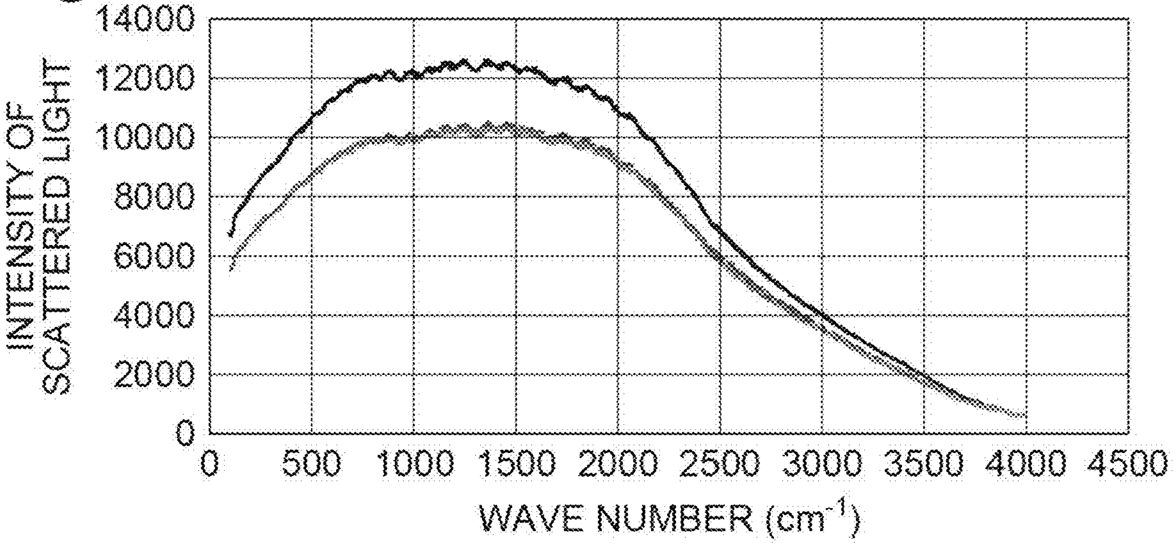
Figure 19A:
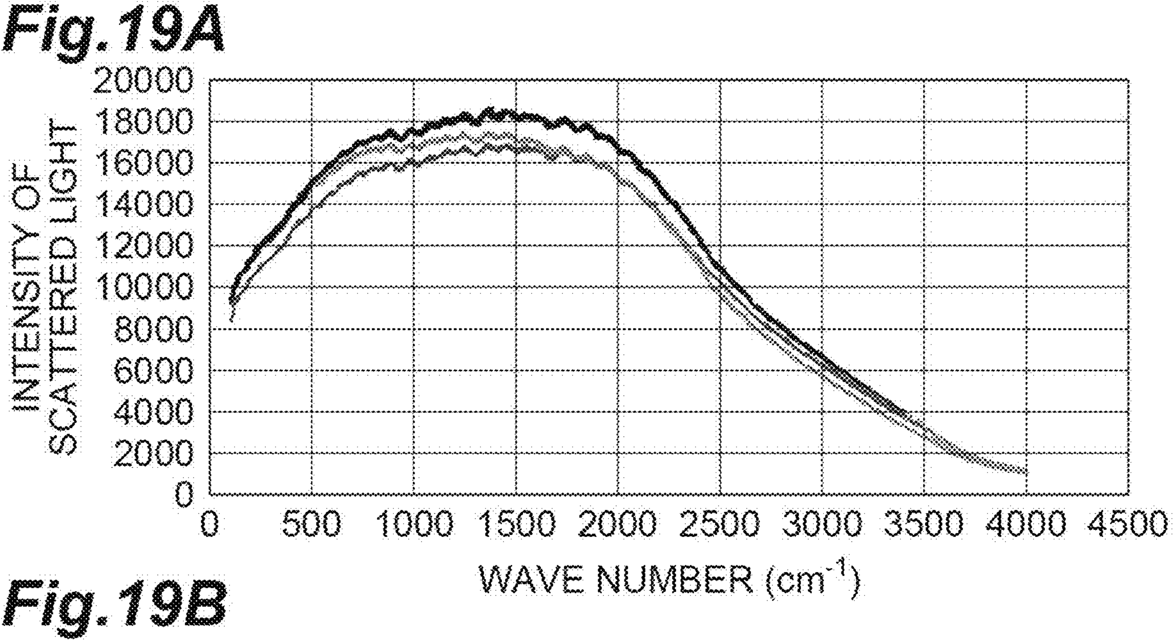
FIGS. 19A, 19B, and 19C are views illustrating analysis results when performing Raman spectroscopy on a processed portion irradiated with laser light in Test Nos. 16 to 18, respectively.
Figure 19B:
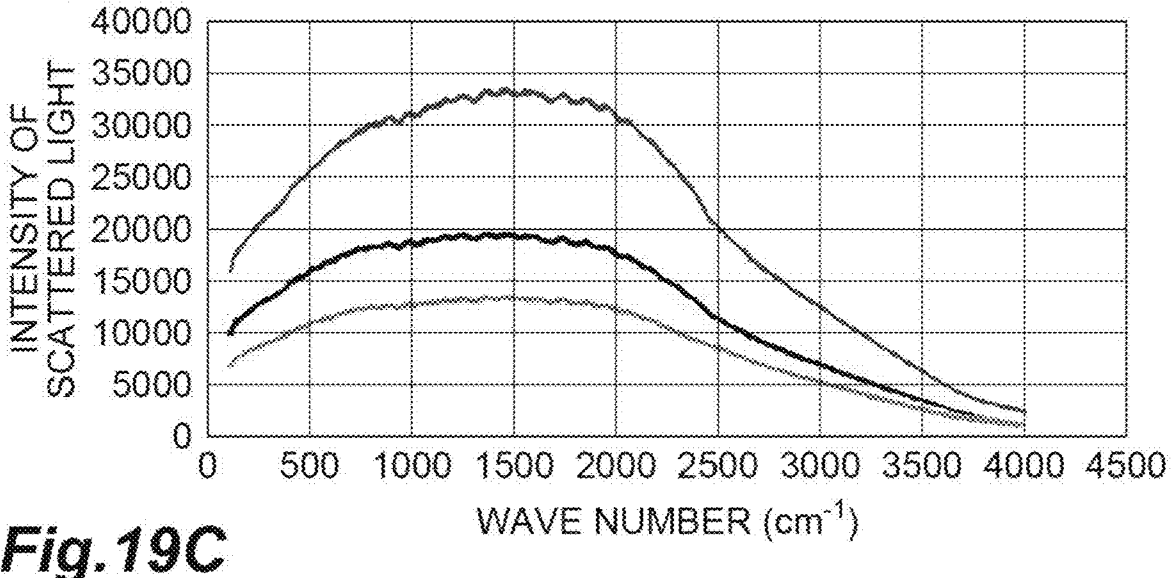
Figure 19C:
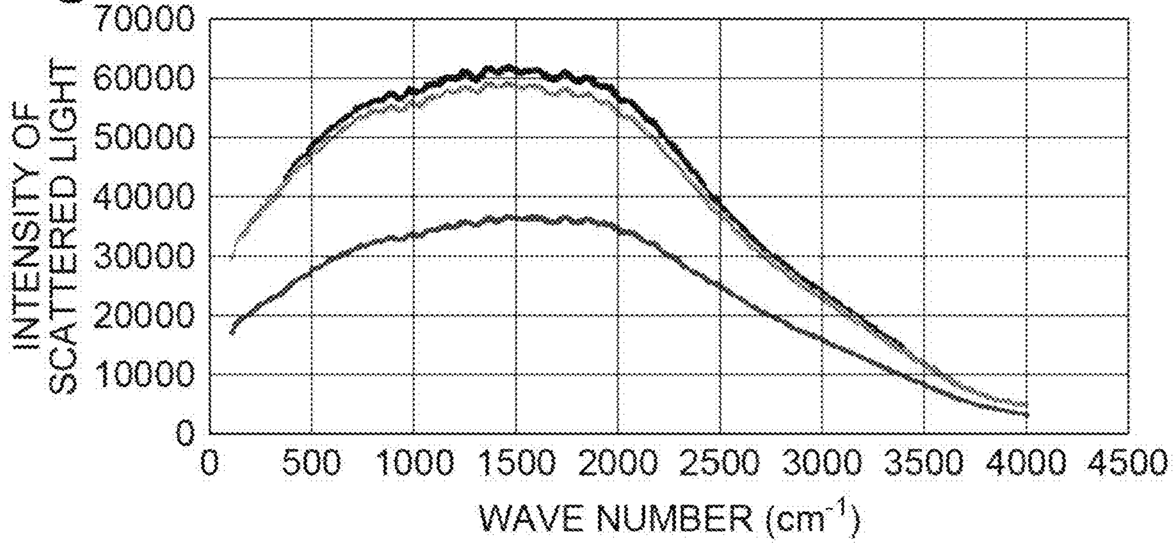

Next, formation of the diamond-like carbon 4 when further changing the material of the resin 2 and changing irradiation conditions of the laser light L will be described with reference to FIGS. 16, 17, 18A, 18B, 18C, 19A, 19B, 19C, 20A, and 20B. FIGS. 16 and 17 are views illustrating irradiation conditions of the laser light L and images of the surface 1*a* of the member 1 after being irradiated with the laser light L. FIGS. 18A, 18B, 18C, 19A, 19B, 19C, 20A, and 20B show analysis results when performing the Raman spectroscopy on a processed portion of the member 1 irradiated with the laser light L. In FIGS. 18A, 18B, 18C, 19A, 19B, 19C, 20A, and 20B, analysis results of three points included in the portion irradiated with the laser light L in the member 1 are shown. In this example, a member 1 containing polyamide 6 (PA6) as the resin 2, and a wood powder as the plant powder 3 was used. A content rate of the wood powder in the member 1 was 50 wt %. Irradiation with the laser light L was performed at a processing rate of 0.1 mm/s. In FIGS. 16 and 17, definitions of a processing portion height, an average output, pulse energy, a beam diameter, an irradiation intensity, a fluence, a processing pitch (X), and a processing pitch (Y) are as in FIGS. 7 and 8 described above.

FIGS. 18A, 18B, 18C, 19A, 19B, 19C, and 20A are views illustrating analysis results when performing the Raman spectroscopy on a processed portion of the member 1 irradiated with the laser light L in Test Nos. 13 to 19. As illustrated in the drawings, in Test Nos. 13 to 19, a peak shape similar to FIG. 6A was not found, and the diamond-like carbon 4 could not be confirmed.

Figure 20A:
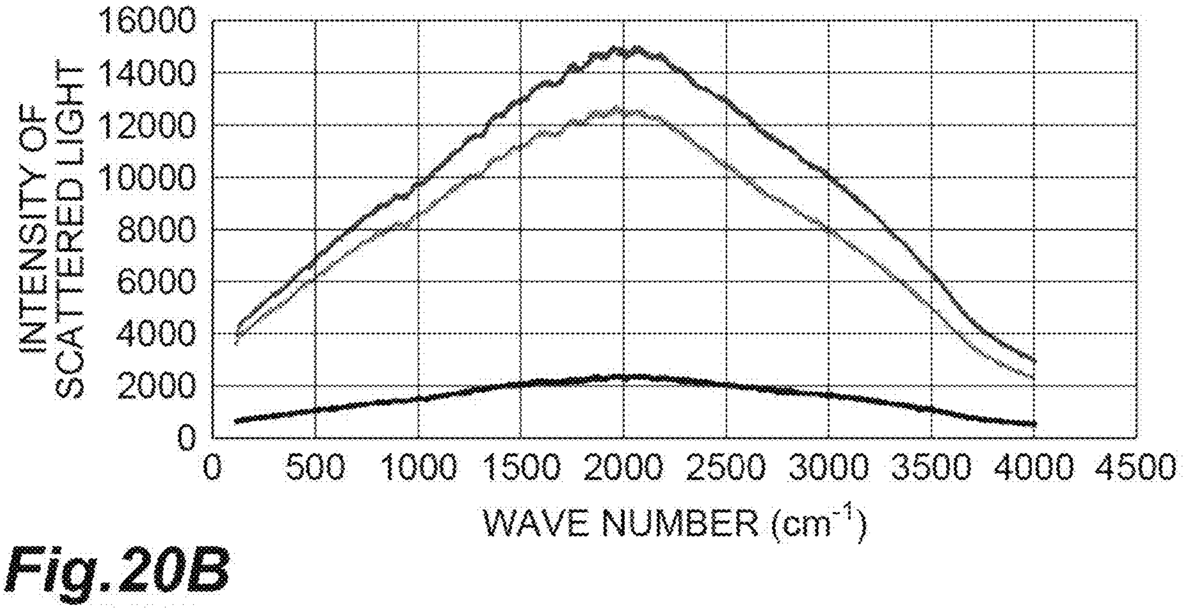
FIG. 20A is a view illustrating analysis results when performing Raman spectroscopy on a processed portion irradiated with laser light in Test No. 19.
Figure 20B:
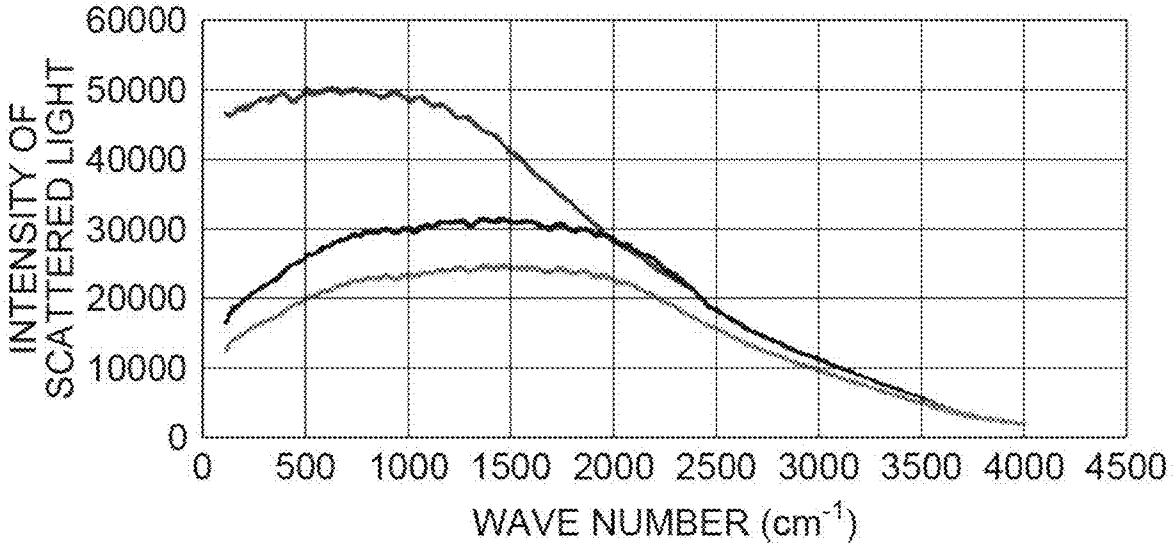
FIG. 20B is a view illustrating analysis results when performing Raman spectroscopy on a portion not irradiated with laser light in a member used in Test Nos. 13 to 19.

FIG. 20B is a view illustrating analysis results when performing the Raman spectroscopy on a portion not irradiated with the laser light L in the member 1 used in Test Nos. 13 to 19 for comparison. In FIG. 20B, since a peak shape similar to FIG. 6A was absolutely not observed, it could be seen that the diamond-like carbon 4 was not formed in the portion not irradiated with the laser light L.

FIGS. 21A, 21B, 21C, and 22A show Raman spectroscopy results when further changing irradiation conditions of the laser light L with respect to the same member 1 used in Test Nos. 13 to 19 described above. Irradiation with the laser light L was performed at fluence of 0.79 mJ/$cm^2$, an irradiation intensity of 0.79 GW/$cm^2$, and peak power of 3.3 MW.

Figure 21A:
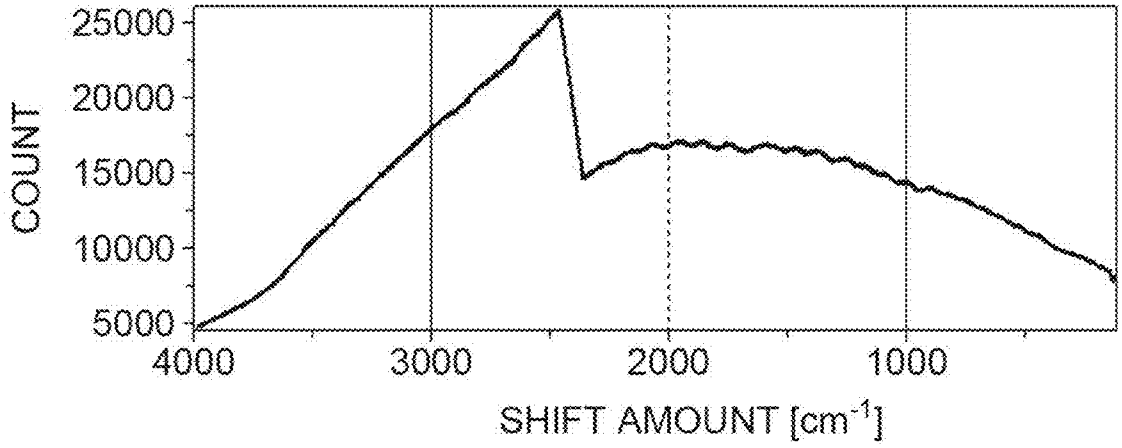
FIGS. 21A, 21B, and 21C are views illustrating results of Raman spectroscopy.
Figure 21B:
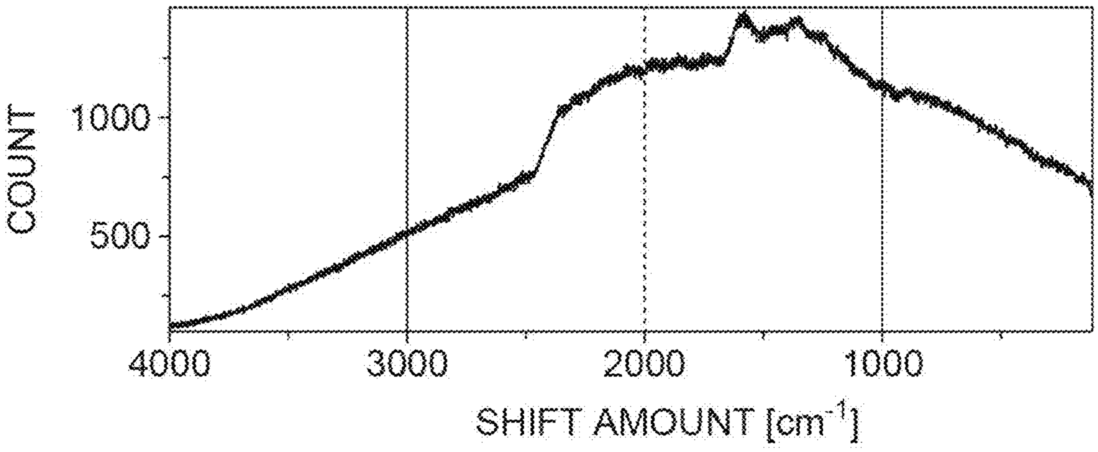
Figure 21C:
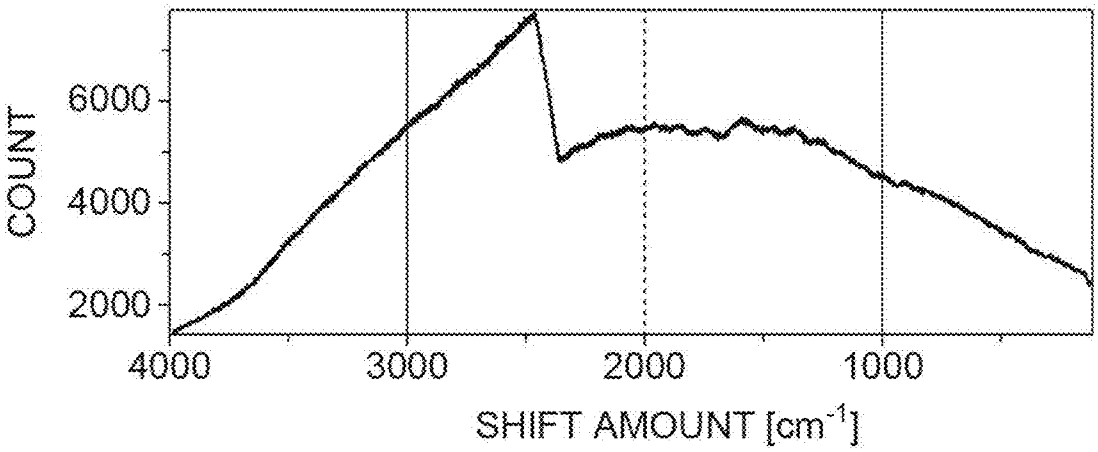

In results shown in FIG. 21A, a peak shape similar to FIG. 6A was not found, and formation of the diamond-like carbon 4 could not be confirmed. However, in results shown in FIGS. 21B, 21C, and 22A, since a peak shape similar to FIG. 6A was observed, formation of the diamond-like carbon 4 could be confirmed.

Figure 22A:
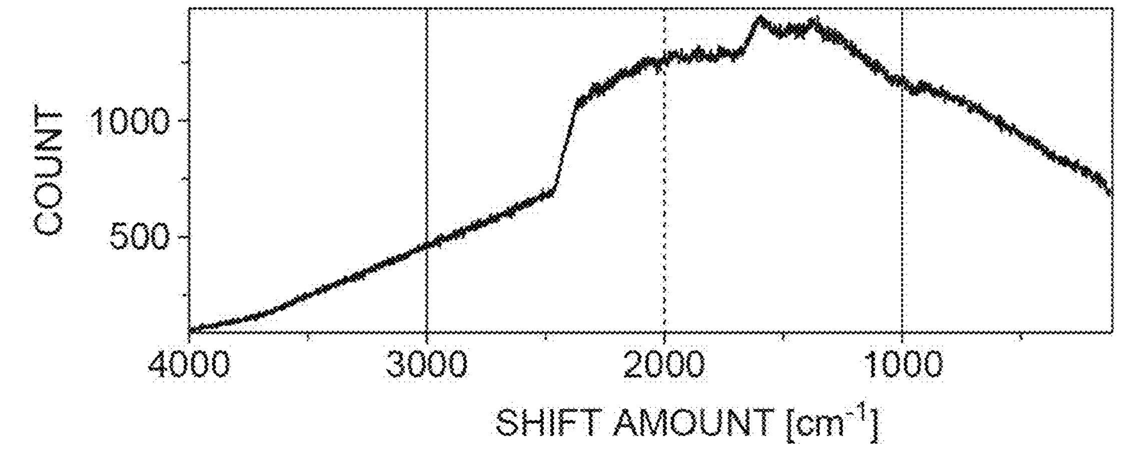
FIGS. 22A, 22B, and 22C are views illustrating results of Raman spectroscopy.
Figure 22B:
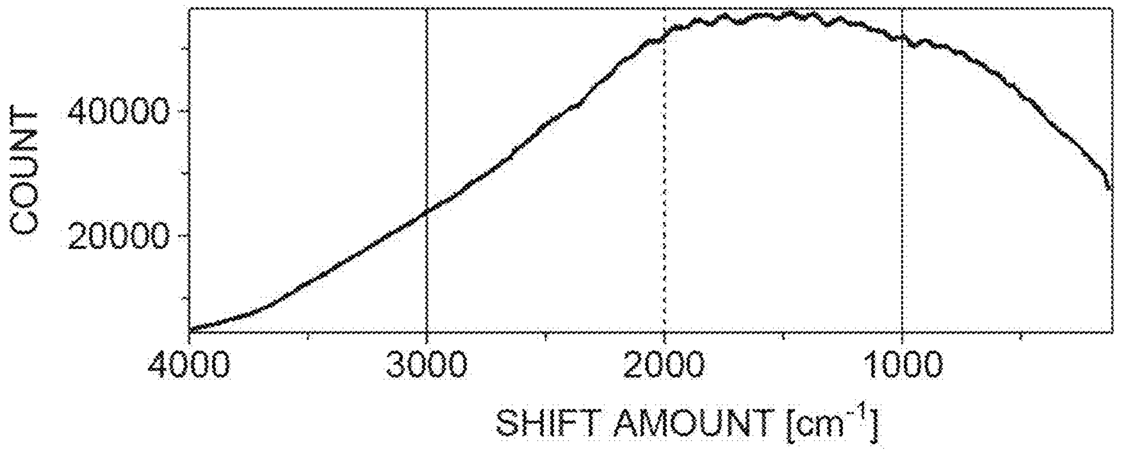
Figure 22C:
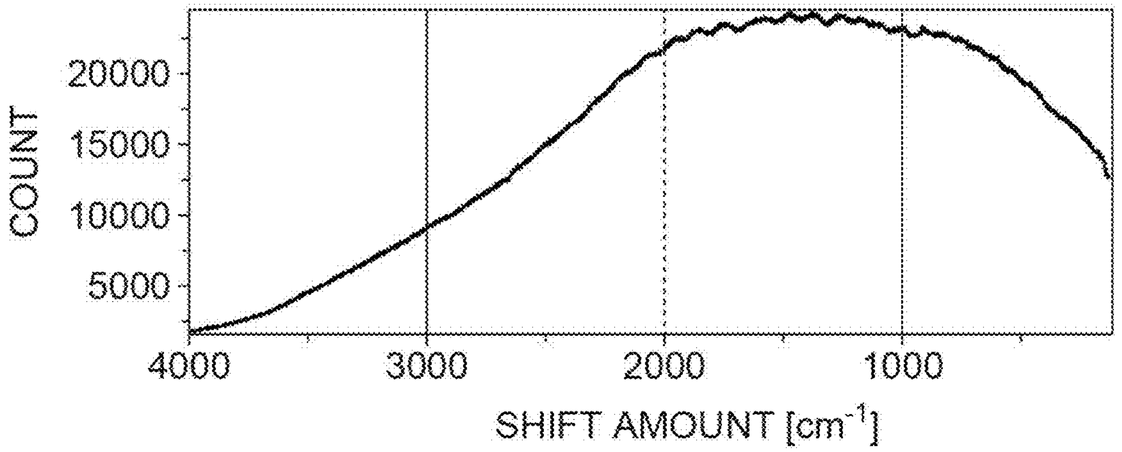

FIGS. 22B and 22C are views illustrating analysis results when performing the Raman spectroscopy on a portion not irradiated with the laser light L in the same member 1 as in Test Nos. 13 to 19 described above for comparison. In the drawings, since a peak shape similar to FIG. 6A was not observed, it could be seen that the diamond-like carbon 4 was not formed in the portion not irradiated with the laser light L.

Example 4

Figure 23:
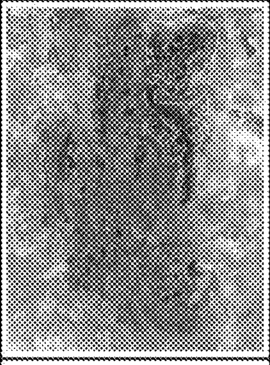
FIG. 23 is a view illustrating irradiation conditions of laser light and images of the surface of the member after being irradiated with laser light.
Figure 23:
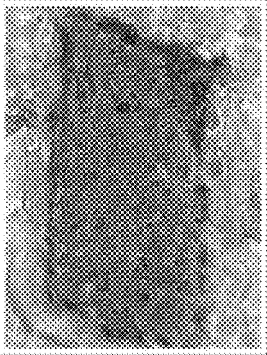
Figure 23:
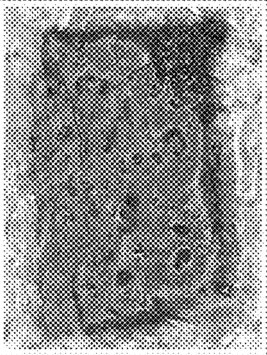
Figure 23:
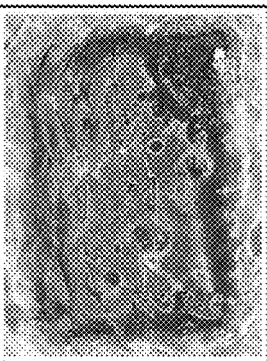
Figure 24:
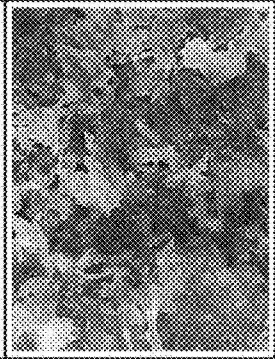
FIG. 24 is a view illustrating irradiation conditions of laser light and images of the surface of the member after being irradiated with laser light.
Figure 24:
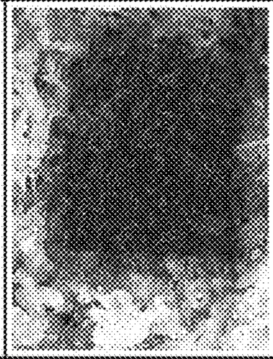
Figure 24:
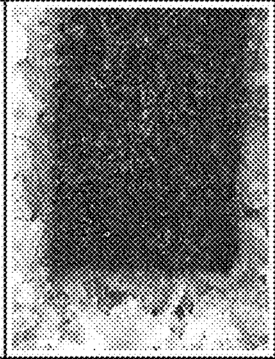
Figure 24:
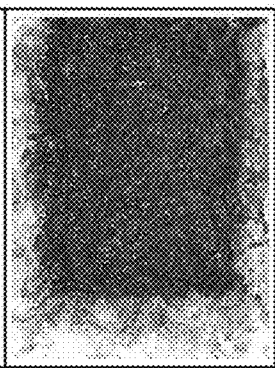

Next, formation of the diamond-like carbon 4 when using a bamboo powder as the plant powder 3 will be described. FIGS. 23 and 24 are views illustrating irradiation conditions of the laser light L, and images of the surface 1*a* of the member 1 after being irradiated with the laser light L. FIGS. 25A, 25B, 25C, 26A, 26B, and 26C show analysis results when performing the Raman spectroscopy on a processed portion of the member 1 after being irradiated with the laser light L. In the experiments, a member 1 containing polypropylene (PP) as the resin 2, and a bamboo powder as the plant powder 3 was used. A content rate of the bamboo powder in the member 1 was 30 wt %. In the experiments, with regard to the member 1 before irradiation with the laser light L, polypropylene was heated with a heat gun to be softened, the bamboo powder was kneaded with the polypropylene, and the resultant mixture was compression-molded to form the member 1 in a flat plate shape.

In Test Nos. 20 to 23 in FIG. 23, irradiation with the laser light L was performed at fluences of 0.26 mJ/$cm^2$, 0.30 mJ/$cm^2$, 0.34 mJ/$cm^2$, and 0.39 mJ/$cm^2$, respectively. As illustrated in FIG. 23, in Test Nos. 20 to 23, a carbonized layer such as the diamond-like carbon 4 could not be visually confirmed.

In an example relating to FIG. 24, a member 1 containing polypropylene (PP) as the resin 2 and a bamboo powder as the plant powder 3 was used. A content rate of the bamboo powder in the member 1 was 50 wt %. A method of forming the member 1 was similar to the method shown in FIG. 23. In Test No. 24 shown in FIG. 24, irradiation with the laser light L was performed at a fluence of 0.10 mJ/$cm^2$. As illustrated in FIG. 24, in Test No. 24, a carbonized layer such as diamond-like carbon could not be visually confirmed. In Test Nos. 25 to 27 shown in FIG. 24, irradiation with the laser light L was performed at fluences of 0.17 mJ/$cm^2$, 0.26 mJ/cm$^2$, and 0.36 mJ/cm$^2$. As illustrated in FIG. 24, in Test Nos. 25 to 27, a carbonized layer such as the diamond-like carbon 4 was visually confirmed.

Analysis results when performing the Raman spectroscopy on a portion irradiated with the laser light L and a portion not irradiated with the laser light L in the member 1 used in Test No. 27 will be described with reference to FIGS. 25A, 25B, 25C, 26A, 26B, and 26C.

Figure 25A:
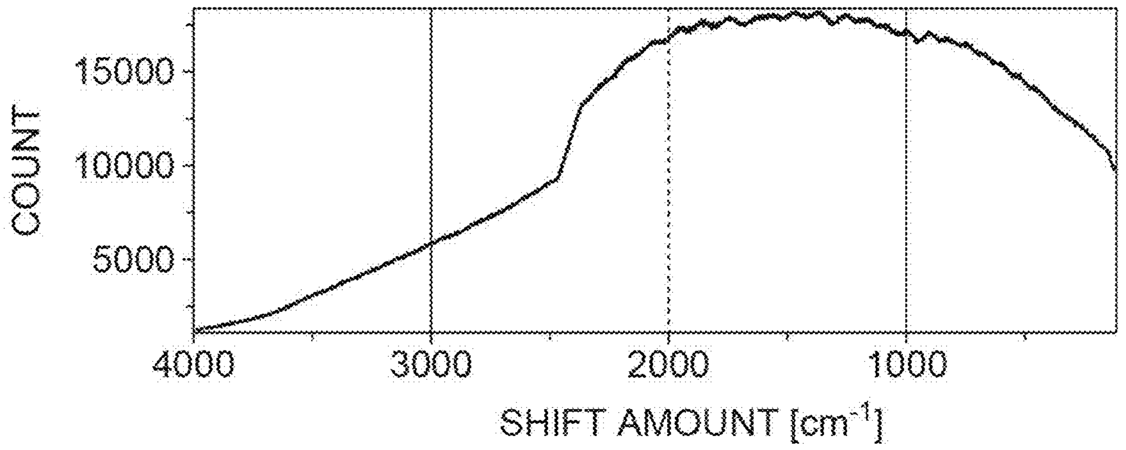
FIGS. 25A, 25B, and 25C are views illustrating analysis results when performing Raman spectroscopy on a processed portion irradiated with laser light in Test No. 27.
Figure 25B:
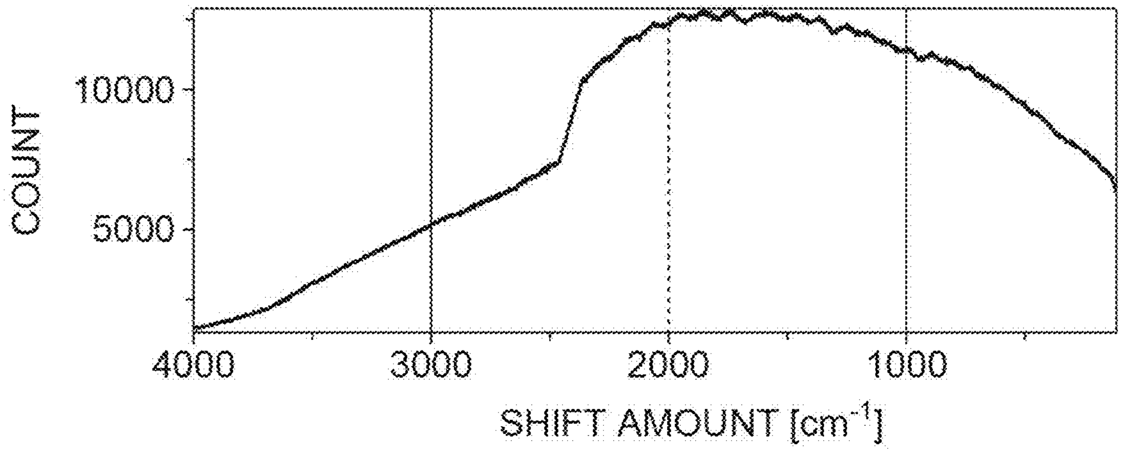
Figure 25C:
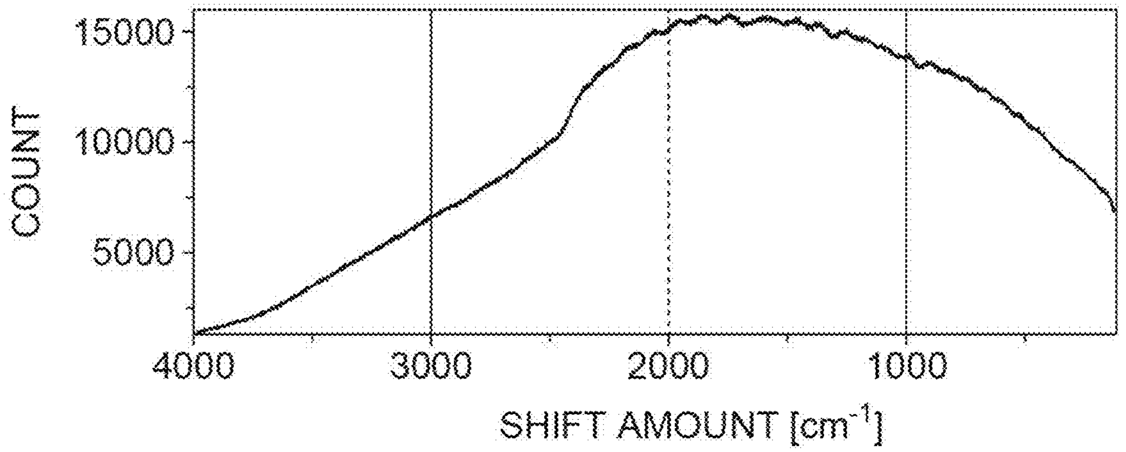

FIGS. 25A, 25B, 25C, and 26A are views illustrating analysis results when performing the Raman spectroscopy on a processed portion irradiated with the laser light L in Test No. 27. In FIGS. 25A, 25B, and 25C, since a peak shape similar to FIG. 6A was not observed, the diamond-like carbon 4 could not confirmed at portions shown in FIGS. 25A, 25B, and 25C. In contrast, in FIG. 26A, a peak shape similar to FIG. 6A was observed. Accordingly, it could be confirmed that a carbonized layer visually confirmed in Test No. 27 contains diamond-like carbon.

Figure 26A:
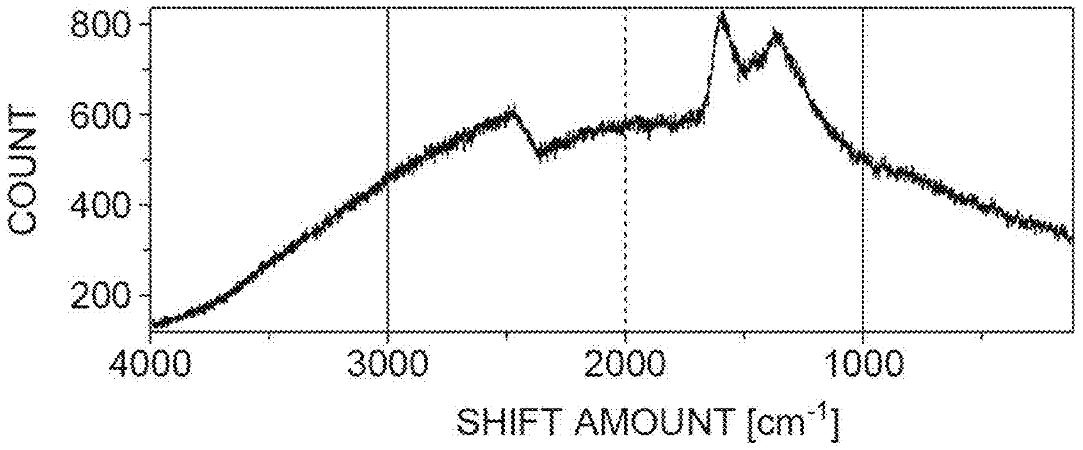
FIG. 26A is a view illustrating results when performing Raman spectroscopy on the processed portion irradiated with laser light in Test No. 27.
Figure 26B:
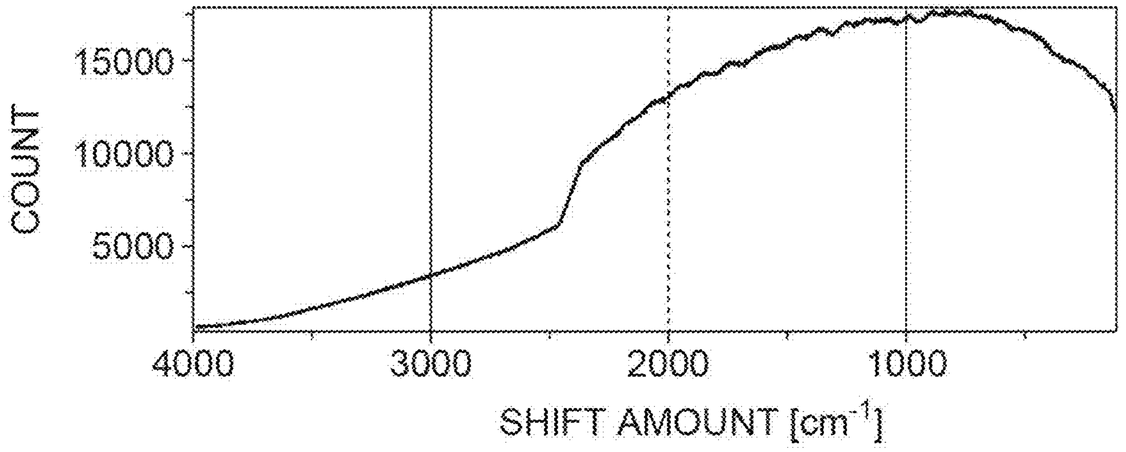
FIGS. 26B and 26C are views illustrating results when performing Raman spectroscopy on a portion not irradiated with laser light in Test No. 27.
Figure 26C:
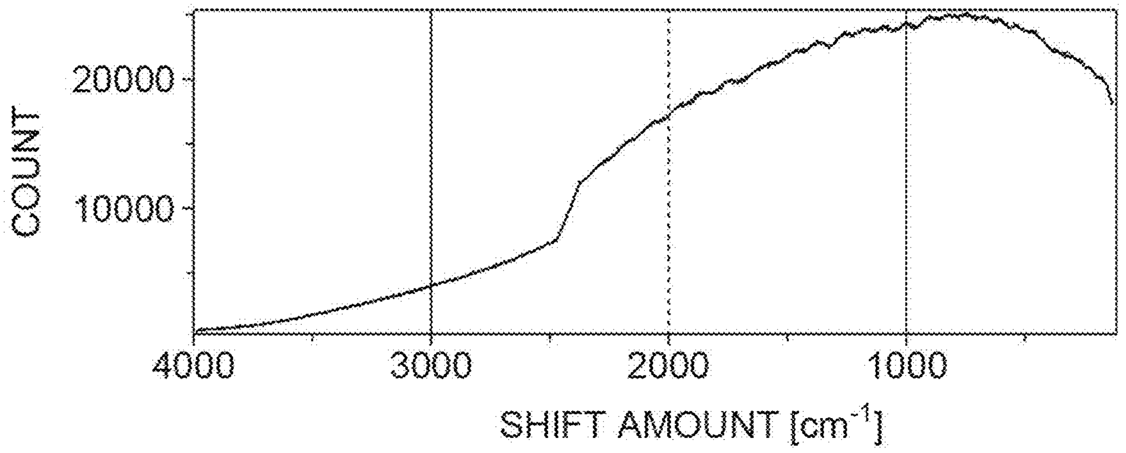

FIGS. 26B and 26C are views illustrating analysis results when performing the Raman spectroscopy on a portion not irradiated with the laser light L in Test No. 27. In FIGS. 26B and 26C, since a peak shape similar to FIG. 6A was not observed, it could be seen that diamond-like carbon was not formed in the portion not irradiated with the laser light L.

Example 5

Figure 27:
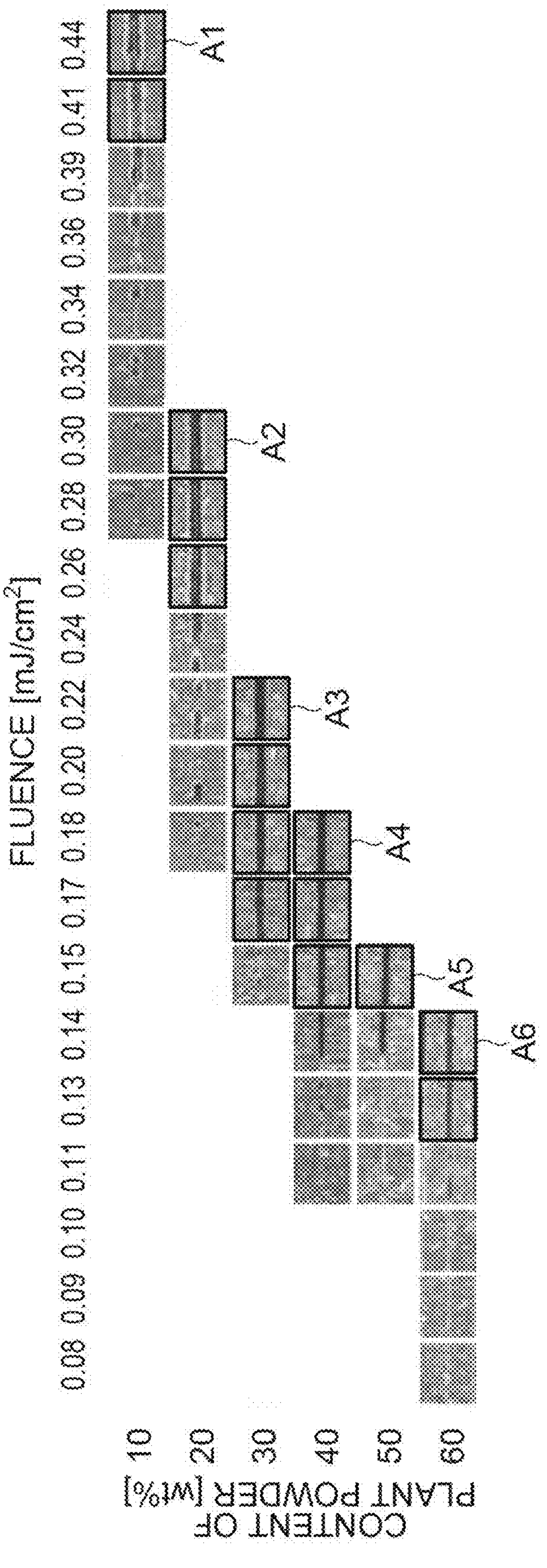
FIG. 27 is a view illustrating images of the surface of the member after being irradiated with laser light when changing a fluence of the laser light and a content rate of a plant powder.
Figure 28:
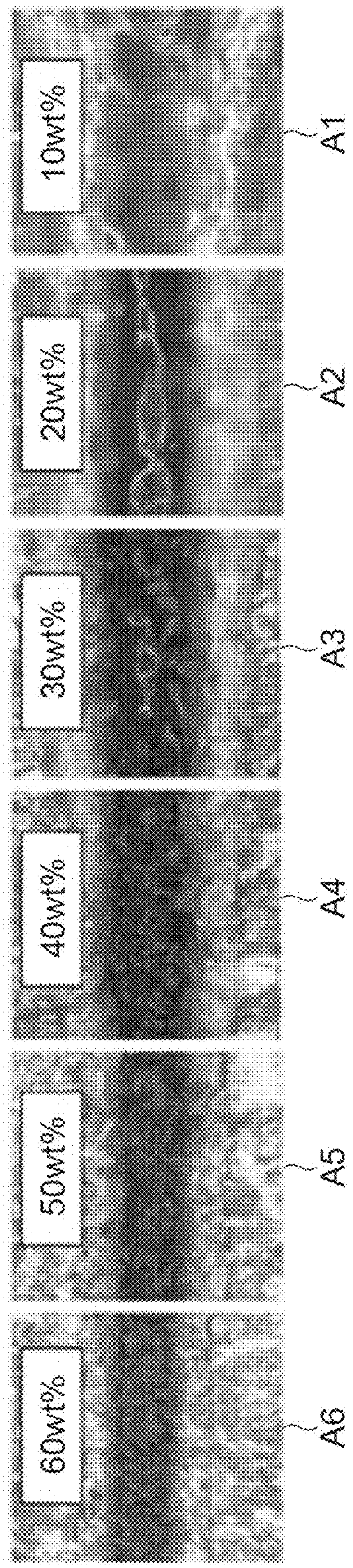
FIG. 28 is a view obtained by enlarging parts of the images in FIG. 27.

The present inventors have investigated a relationship between the content rate of the plant powder 3 and the fluence of the laser light L, and easiness of formation of the diamond-like carbon 4. FIG. 27 is a view illustrating whether or not the diamond-like carbon 4 is formed when changing the fluence of the laser light L and the content rate of the plant powder 3. In this example, a member 1 containing polypropylene as the resin 2 and a wood powder as the plant powder 3 was used. In FIG. 27, an image surrounded with a bold frame line represents a portion where the diamond-like carbon 4 is formed in the member 1. FIG. 28 is a view obtained by enlarging images A1 to A6 among a plurality of images surrounded with the bold frame line in FIG. 27. In FIG. 27, an image not surrounded with the bold frame line represents a portion where the diamond-like carbon 4 is not formed in the member 1. The fluence of the laser light L represents a fluence of the laser light L on the surface 1*a* of the member 1.

As illustrated in FIG. 27, in a case where the content rate of the plant powder 3 was 10 wt %, the diamond-like carbon 4 was formed when the fluence of the laser light L was 0.41 mJ/cm$^2$ or more, and formation of the diamond-like carbon 4 could not be confirmed when the fluence of the laser light L was 0.39 mJ/cm$^2$ or less. In a case where the content rate of the plant powder 3 was 20 wt %, the diamond-like carbon 4 was formed when the fluence of the laser light L was 0.26 mJ/cm$^2$ or more, and formation of the diamond-like carbon 4 could not be confirmed when the fluence of the laser light L was 0.24 mJ/cm$^2$ or less. In a case where the content rate of the plant powder 3 was 30 wt %, the diamond-like carbon 4 was formed when the fluence of the laser light L was 0.17 mJ/cm$^2$ or more, and formation of the diamond-like carbon 4 could not be confirmed when the fluence of the laser light L was 0.15 mJ/cm$^2$ or less. In a case where the content rate of the plant powder 3 was 40 wt %, the diamond-like carbon 4 was formed when the fluence of the laser light L was 0.15 mJ/cm$^2$ or more, and formation of the diamond-like carbon 4 could not be confirmed when the fluence of the laser light L was 0.14 mJ/cm$^2$ or less. In a case where the content rate of the plant powder 3 was 50 wt %, the diamond-like carbon 4 was formed when the fluence of the laser light L was 0.15 mJ/cm$^2$ or more, and formation of the diamond-like carbon 4 could not be confirmed when the fluence of the laser light L was 0.14 mJ/cm$^2$ or less. In a case where the content rate of the plant powder 3 was 60 wt %, the diamond-like carbon 4 was formed when the fluence of the laser light L in irradiation was 0.13 mJ/cm$^2$ or more, and formation of the diamond-like carbon 4 could not be confirmed when the fluence of the laser light L was 0.11 mJ/cm$^2$ or less.

From the results, in a case where the content rate of the plant powder 3 is 30 wt % or more, the fluence of the laser light L for forming the diamond-like carbon 4 in the member 1 slightly increases such as 0.13 mJ/cm$^2$ (the case of 60 wt %), 0.15 mJ/cm$^2$ (the case of 50 wt % and 40 wt %), and 0.17 mJ/cm$^2$ (the case of 30 wt %) in accordance with a decrease in the content rate of the plant powder 3. In contrast, in a case where the content rate of the plant powder 3 is 20 wt % or less, the fluence of the laser light L for forming the diamond-like carbon 4 in the member 1 rapidly increases such as 0.26 mJ/cm$^2$ (the case of 20 wt %), and 0.41 mJ/cm$^2$ (the case of 10 wt %) in accordance with a decrease in the content rate of the plant powder 3. Accordingly, in a case where the content rate of the plant powder 3 is 30 wt % or more, the fluence of the laser light L for forming the diamond-like carbon 4 significantly decreases in comparison to the case where the content rate of the plant powder 3 is 20% or less.

Example 6

Figure 29:
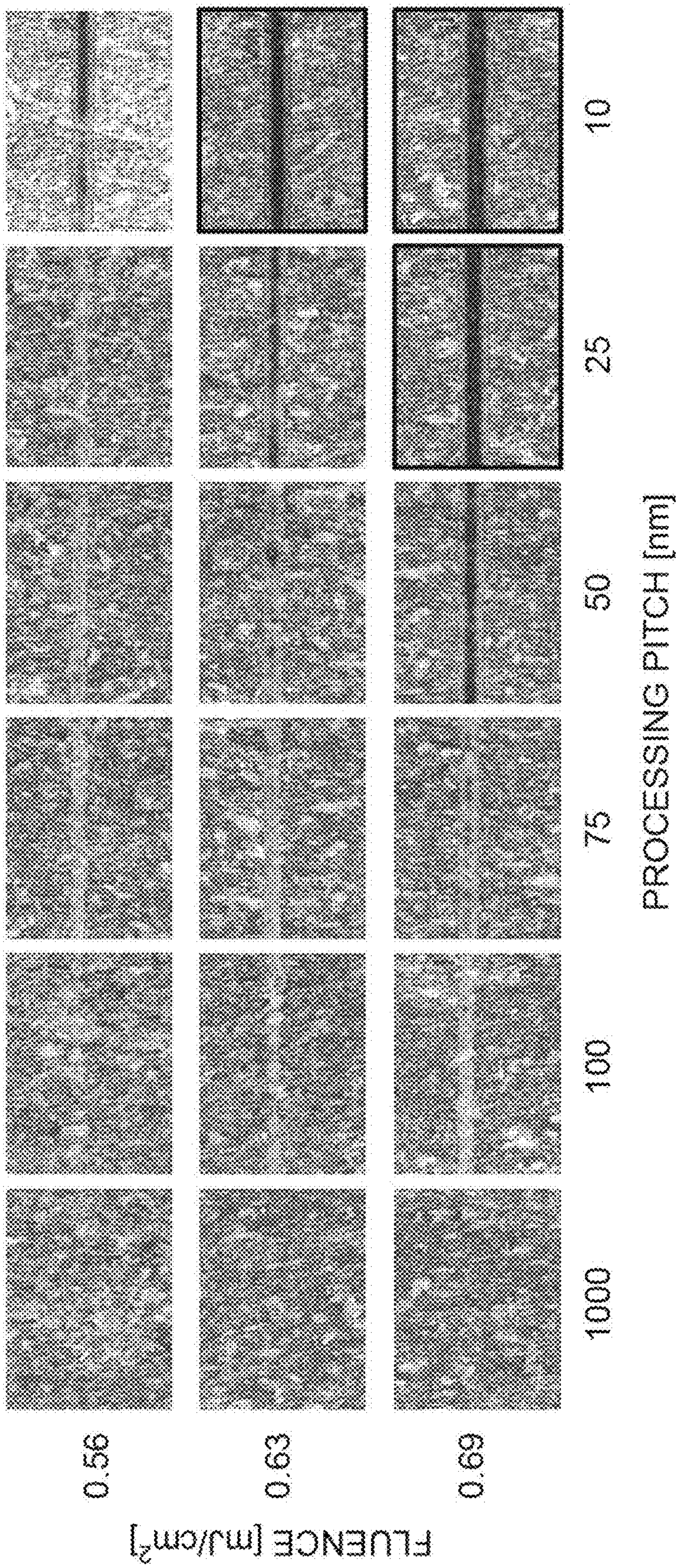
FIG. 29 is a view illustrating images of the surface of the member after being irradiated with laser light when changing a fluence of laser light and a processing pitch.

The present inventors have investigated a relationship between easiness of formation of the diamond-like carbon 4 and both of the fluence of the laser light L and the processing pitch Xp. FIG. 29 is a view illustrating images of the surface 1*a* of the member 1 after being irradiated with the laser light L when changing the fluence of the laser light L and the processing pitch Xp. In this example, a member 1 containing polypropylene (PP) as the resin 2 and a wood powder as the plant powder 3 was used. A content rate of the wood powder in the member 1 was 60 wt %.

As illustrated in FIG. 29, in a case where the fluence of the laser light L is 0.63 mJ/cm$^2$, since a continuous carbonized layer can be confirmed when the processing pitch Xp is 10 nm, it can be estimated that diamond-like carbon was formed in comparison to images of the respective examples described above. In a case where the fluence of the laser light L is 0.69 mJ/cm$^2$, since a continuous carbonized layer can be confirmed when the processing pitch Xp is 25 nm and 10 nm, it can also be estimated that diamond-like carbon was formed.

Example 7

Figure 30:
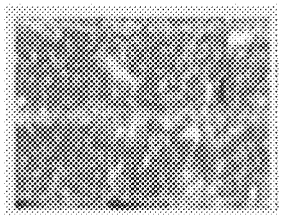
FIG. 30 is a view illustrating irradiation conditions of laser light and images of the surface of the member after being irradiated with laser light.
Figure 30:
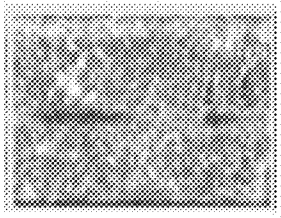
Figure 30:
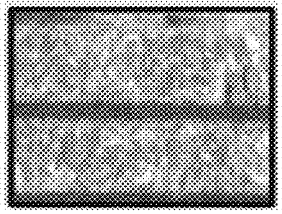
Figure 30:
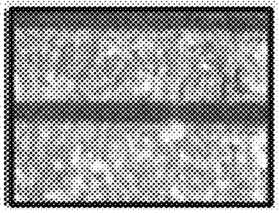
Figure 31:
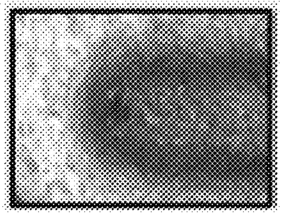
FIG. 31 is a view illustrating irradiation conditions of laser light and images of the surface of the member after being irradiated with laser light.
Figure 31:
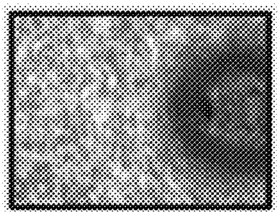
Figure 31:
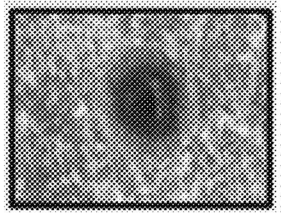
Figure 32:
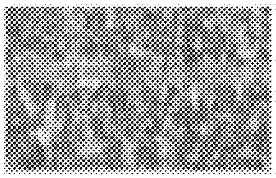
FIG. 32 is a view illustrating irradiation conditions of laser light and images of the surface of the member after being irradiated with laser light.
Figure 32:
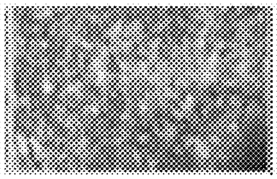
Figure 32:
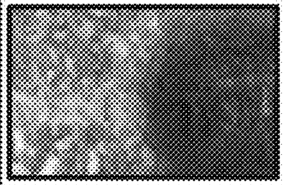
Figure 32:
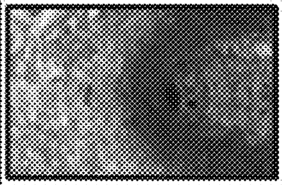

The present inventors have investigated a relationship between easiness of formation of the diamond-like carbon 4 and both of a wavelength of the laser light L and a pulse width. FIGS. 30 to 32 are views illustrating a plurality of irradiation conditions of the laser light L, and images of the surface 1*a* of the member 1 after being irradiated with the laser light L. In this example, a member 1 containing polypropylene as the resin 2 and a wood powder as the plant powder 3 was used. A content rate of the wood powder in the member 1 was 60 wt %. Irradiation with the laser light L was performed at a processing rate of 0.1 mm/s.

In the example illustrated in FIG. 30, in a case where the wavelength of the laser light L was 515 nm and the pulse width was 1.0 ps, formation of the diamond-like carbon 4 was confirmed when changing a maximum output and the fluence of the laser light L. As illustrated in FIG. 30, since a continuous carbonized layer is observed when the maximum output of the laser light L is 0.52 MW and the fluence is 0.13 $mJ/cm^2$, and when the maximum output of the laser light L is 0.57 MW and the fluence is 0.14 $mJ/cm^2$, it can be estimated that diamond-like carbon was formed from comparison with images of the respective examples described above. On the other hand, the continuous carbonized layer was not observed when the maximum output of the laser light L was 0.42 MW and the fluence was 0.10 $mJ/cm^2$, and when the maximum output of the laser light L was 0.47 MW and the fluence was 0.11 $mJ/cm^2$.

In an example illustrated in FIG. 31, in a case where the wavelength of the laser light L was 1030 nm and the pulse width was 1.0 ps, formation of the diamond-like carbon 4 was confirmed when changing the maximum output and the fluence of the laser light L. As illustrated in FIG. 31, since a continuous carbonized layer is observed when the maximum output of the laser light L is 7.3 MW and the fluence is 4.00 $mJ/cm^2$, when the maximum output of the laser light L is 8.0 MW and the fluence is 4.37 $mJ/cm^2$, and when the maximum output of the laser light L is 11.6 MW and the fluence is 6.35 $mJ/cm^2$, it can be estimated that diamond-like carbon was formed from comparison with images of the respective examples described above. On the other hand, when the maximum output of the laser light L was 5.7 MW and the fluence was 3.11 $mJ/cm^2$, the continuous carbonized layer and a processing trace could not be confirmed.

In an example illustrated in FIG. 32, in a case where the wavelength of the laser light L was 1064 nm and the pulse width was 1.0 μs, formation of the diamond-like carbon 4 was confirmed when changing the maximum output and the fluence of the laser light L. As illustrated in FIG. 32, since a continuous carbonized layer could be confirmed when the maximum output of the laser light L was 9.4 MW and the fluence was 7.23 $mJ/cm^2$, and when the maximum output of the laser light L was 10.1 MW and the fluence was 7.77 $mJ/cm^2$, it can be estimated that diamond-like carbon was formed from comparison with images of the respective examples described above. On the other hand, the continuous carbonized layer could not be confirmed when the maximum output of the laser light L was 5.7 MW and the fluence was 4.37 $mJ/cm^2$, and when the maximum output of the laser light L was 8.2 MW and the fluence was 6.35 $mJ/cm^2$. When the maximum output of the laser light L was 8.7 MW and the fluence was 6.70 $mJ/cm^2$, a processing trace could not be confirmed.

As is clear from comparison between FIGS. 30 and 31, the maximum output and the fluence of the laser light L for forming the diamond-like carbon 4 when the wavelength of the laser light L is 515 nm are significantly smaller than the maximum output and the fluence of the laser light L for forming the diamond-like carbon 4 when the wavelength of the laser light L is 1030 nm, and is, for example, approximately 1/10 times. From this, it can be seen that the wavelength of the laser light L may be short (for example, 515 nm or less) for suppressing energy necessary for the laser light L to a small value.

As is clear from comparison between FIGS. 31 and 32, the maximum output and the fluence of the laser light L for forming the diamond-like carbon 4 when the pulse width is 1.0 ps are smaller than the maximum output and the fluence of the laser light L for forming the diamond-like carbon 4 when the pulse width is 1.0 μs. From this, it can be seen that the pulse width of the laser light L may be smaller (for example, 1.0 ps or less) for suppressing energy necessary for the laser light L to a small value.

Example 8

Figure 33A:
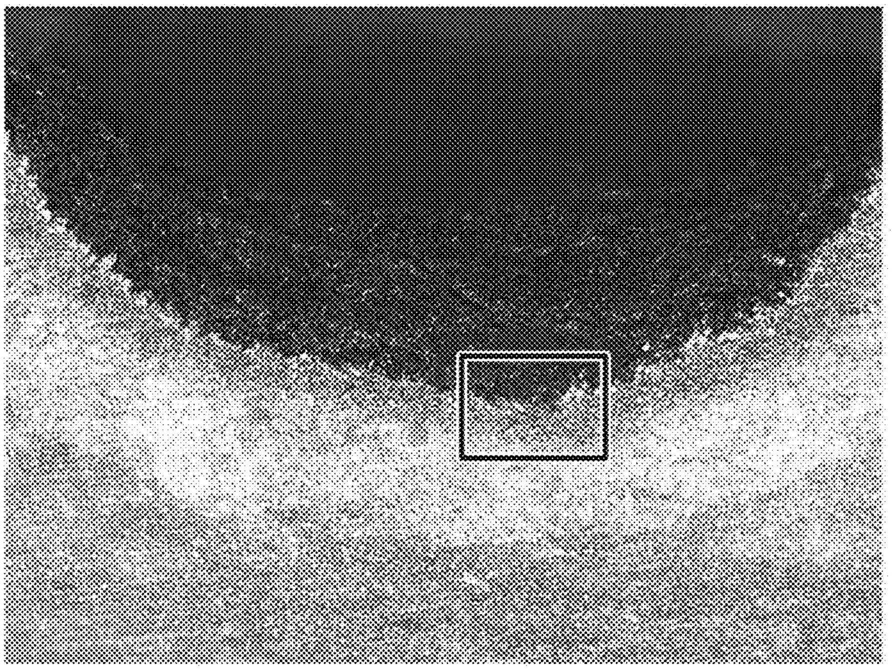
FIG. 33A is a view illustrating a cross-sectional image of a resin member in which diamond-like carbon is formed.
Figure 33B:
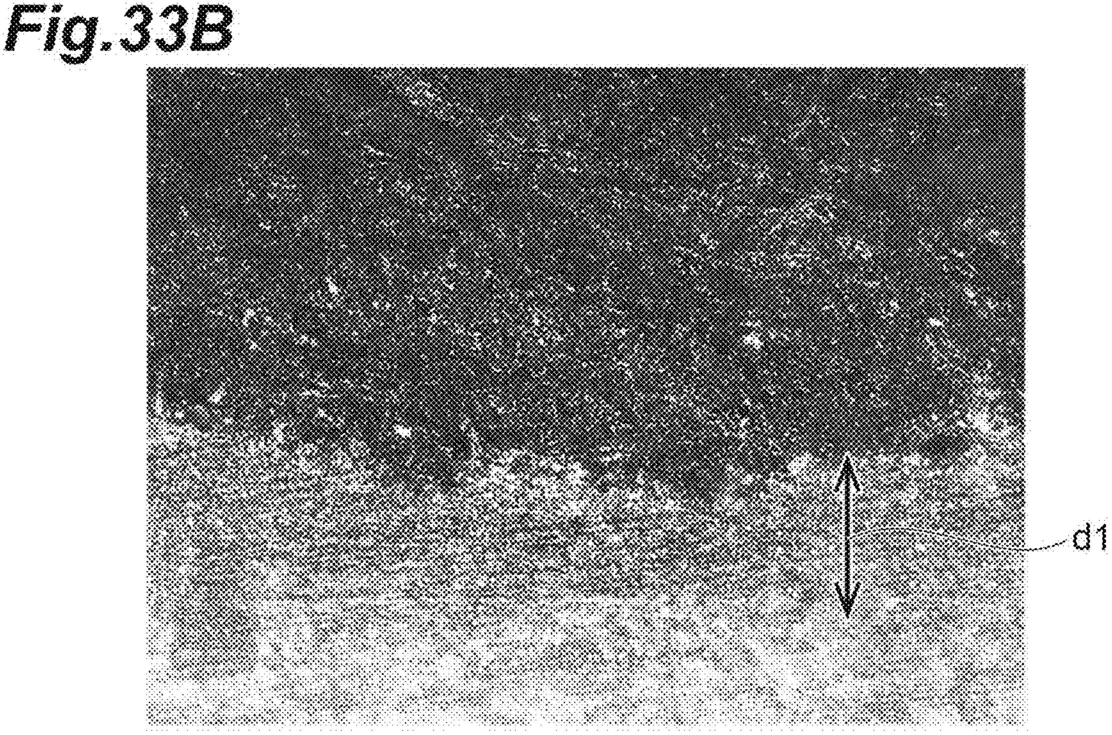
FIG. 33B is an enlarged view of the image within a rectangular area illustrated in FIG. 33A.
Figure 34A:
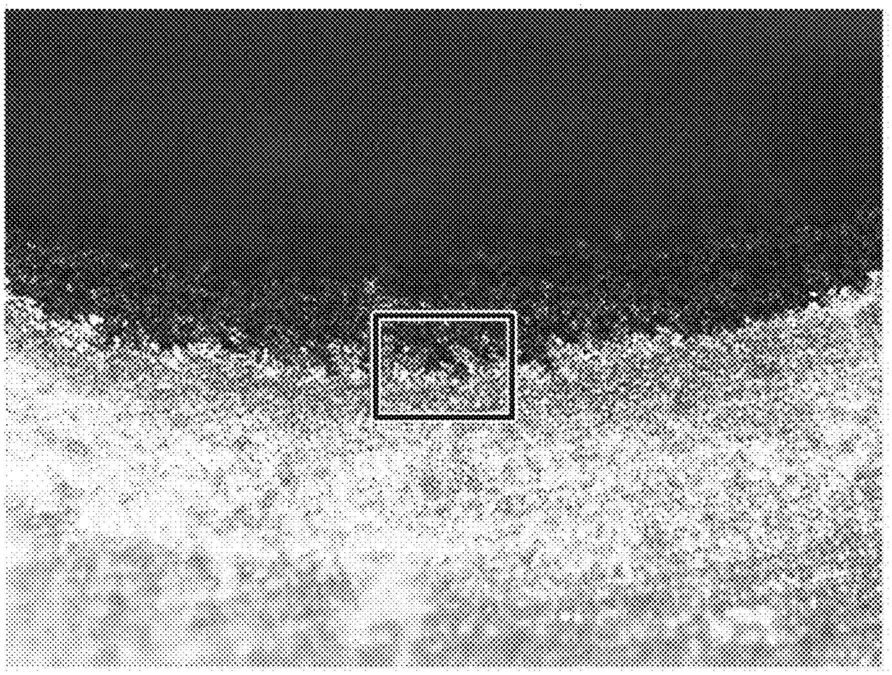
FIG. 34A is a view illustrating a cross-sectional image of a resin member in which diamond-like carbon is formed.
Figure 34B:
FIG. 34B is an enlarged view of the image within a rectangular area illustrated in FIG. 34A.

The present inventors have investigated a depth in the Z-direction of the surface layer region R. FIGS. 33A and 34A are views illustrating cross-sectional images of the resin member 5 in which the diamond-like carbon 4 is formed. FIGS. 33B and 34B are views obtained by enlarging an image in a rectangular area shown in FIGS. 33A and 34A. When preparing the resin member 5 shown in FIGS. 33A, 33B, 34A, and 34B, a member 1 containing polypropylene as the resin 2 and a wood powder as the plant powder 3 was used. When preparing the resin member 5 shown in FIGS. 33A and 33B, irradiation with the laser light L was performed at a fluence of 0.58 $mJ/cm^2$, peak power of 2.4 MW, and an irradiation intensity of 0.58 $GW/cm^2$. When preparing the resin member 5 shown in FIGS. 34A and 34B, irradiation with the laser light L was performed at a fluence of 0.75 $mJ/cm^2$, peak power of 3.1 MW, and an irradiation intensity of 0.75 $GW/cm^2$. In FIGS. 33B and 34B, depths d1 and d2 of the surface layer region R containing the diamond-like carbon 4 were 197 μm and 234 μm, respectively.

Typically, a film thickness of diamond-like carbon formed by an existing method such as a plasma CVD method is approximately 1 μm, and is approximately 20 μm even if the film thickness is large. Accordingly, the depths d1 and d2 of the surface layer region R containing the diamond-like carbon 4 as shown in FIGS. 33A, 33B, 34A, and 34B are significantly larger in comparison to the film thickness of the diamond-like carbon formed by the existing method such as the plasma CVD method, and is, for example, approximately 10 times.

The method of manufacturing a resin member and the resin member according to the present disclosure are not limited to the above-described embodiment, and various modifications can be made. For example, the wavelength of the laser light L may be shorter than a visible light region, or may be longer than a near-infrared region. The laser light L may be continuous light. The plant powder 3 may include other plant powders (for example, grass, leaves, stems, or roots) other than the wood powder and the bamboo powder. The resin 2 may include other resin materials other than polypropylene, nylon 6, and an ABS resin.

The resin member 5 in the above-described embodiment may be used as a component for vehicles, a component for household electric appliances, or a component of products for houses. Examples of the component for vehicles include seat belt buckles, door rails, windshield wiper motor gears, headlamp actuator gears, and servo motor gears for air conditioners. Examples of the component for household electric appliances include rotary gears of air conditioners, fans, and the like. Examples of the component of products for houses include sliding door wheels, rails, and rotary gears. The rotary gears are used, for example, for automatic doors, opening/closing windows, automatic opening/closing locks, and the like. In this case, it is possible to provide a component for vehicles, a component for household electric appliances, and a component of products for houses which are less likely to be corroded and abraded.

What is claimed is:

1. A method of manufacturing a resin member, comprising:

irradiating a surface of a member containing a resin and a plant powder dispersed in the resin with laser light to change the plant powder or both the resin and the plant powder into diamond-like carbon in a surface layer region including the surface of the resin member, wherein a wavelength of the laser light is 550 nm or less, and wherein the resin includes at least one material among polypropylene, nylon 6, and an ABS resin.

2. The method of manufacturing a resin member according to claim 1, wherein a fluence of the laser light is 0.1 mJ/cm$^2$ or more.

3. The method of manufacturing a resin member according to claim 1, wherein the laser light is pulsed light, and wherein a pulse width of the laser light is 100 ps or less.

4. The method of manufacturing a resin member according to claim 1, wherein a content rate of the plant powder in the member before irradiation with the laser light is 30 wt % or more.

5. The method of manufacturing a resin member according to claim 1, wherein the plant powder includes one or both of a wood powder and a bamboo powder.

6. The method of manufacturing a resin member according to claim 1, wherein when irradiating the surface of the member with laser light, scanning with the laser light is performed along the surface while condensing the laser light.

* * * * *